US010583398B2

(12) United States Patent
Tateoka et al.

(10) Patent No.: US 10,583,398 B2
(45) Date of Patent: Mar. 10, 2020

(54) FRESH WATER PRODUCTION DEVICE AND METHOD FOR OPERATING FRESH WATER PRODUCTION DEVICE

(71) Applicant: TORAY INDUSTRIES, INC., Tokyo (JP)

(72) Inventors: Daishi Tateoka, Otsu (JP); Kazunori Tomioka, Otsu (JP); Tomohiro Maeda, Otsu (JP)

(73) Assignee: Toray Industries, Inc. (JP)

(*) Notice: Subject to any disclaimer, the term of this patent is extended or adjusted under 35 U.S.C. 154(b) by 199 days.

(21) Appl. No.: 15/580,485

(22) PCT Filed: Jun. 6, 2016

(86) PCT No.: PCT/JP2016/066772
§ 371 (c)(1),
(2) Date: Dec. 7, 2017

(87) PCT Pub. No.: WO2016/199725
PCT Pub. Date: Dec. 15, 2016

(65) Prior Publication Data
US 2018/0161728 A1  Jun. 14, 2018

(30) Foreign Application Priority Data
Jun. 9, 2015  (JP) .................... 2015-116428

(51) Int. Cl.
*B01D 61/58* (2006.01)
*C02F 1/44* (2006.01)
(Continued)

(52) U.S. Cl.
CPC .......... *B01D 61/58* (2013.01); *B01D 61/022* (2013.01); *B01D 61/04* (2013.01); *B01D 61/12* (2013.01);
(Continued)

(58) Field of Classification Search
CPC ............ B01D 2311/14; B01D 2313/18; B01D 2321/40; B01D 61/022; B01D 61/025;
(Continued)

(56) References Cited

U.S. PATENT DOCUMENTS

2011/0240554 A1  10/2011  Takeuchi et al.

FOREIGN PATENT DOCUMENTS

JP  10263539 A  10/1998
JP  2007181822 A  7/2007
(Continued)

OTHER PUBLICATIONS

International Search Report and Written Opinion for International Application No. PCT/JP2016/066772, dated Aug. 30, 2016—8 Pages.
(Continued)

*Primary Examiner* — Terry K Cecil
(74) *Attorney, Agent, or Firm* — RatnerPrestia

(57) ABSTRACT

According to the present invention, since a pretreatment mechanism can be operated while inhibiting the pretreated water from fluctuating in pressure, a fresh-water production apparatus is obtained in which the desalting mechanism can be stably operated. Furthermore, the period of water supply or flushing in the step of washing the pretreatment mechanism can be shortened, and the load on the lines where washing is not being performed is hence reduced. Consequently, a fresh-water production apparatus is obtained in which the pretreatment mechanism can be operated while inhibiting the pretreatment membranes from being fouled.

10 Claims, 14 Drawing Sheets

(51) Int. Cl.
*B01D 61/04* (2006.01)
*B01D 61/22* (2006.01)
*C02F 1/00* (2006.01)
*B01D 61/02* (2006.01)
*B01D 61/12* (2006.01)
*B01D 61/14* (2006.01)
*C02F 103/08* (2006.01)

(52) U.S. Cl.
CPC .............. *B01D 61/22* (2013.01); *C02F 1/008* (2013.01); *C02F 1/44* (2013.01); *C02F 1/441* (2013.01); *C02F 1/444* (2013.01); *B01D 61/025* (2013.01); *B01D 61/145* (2013.01); *B01D 61/147* (2013.01); *B01D 2311/14* (2013.01); *B01D 2313/18* (2013.01); *B01D 2321/40* (2013.01); *C02F 2103/08* (2013.01); *C02F 2209/005* (2013.01); *C02F 2209/03* (2013.01); *C02F 2209/40* (2013.01); *C02F 2301/043* (2013.01); *C02F 2303/16* (2013.01)

(58) Field of Classification Search
CPC ...... B01D 61/04; B01D 61/12; B01D 61/145; B01D 61/147; B01D 61/22; B01D 61/58; C02F 1/008; C02F 1/44; C02F 1/441; C02F 1/444; C02F 2103/08; C02F 2209/005; C02F 2209/03; C02F 2209/40; C02F 2301/043; C02F 2303/16
See application file for complete search history.

(56) References Cited

FOREIGN PATENT DOCUMENTS

| | | |
|---|---|---|
| JP | 2008006393 A | 1/2008 |
| JP | 2010125395 A | 6/2010 |
| JP | 2011056340 A | 3/2011 |
| WO | 2013039224 | 3/2013 |

OTHER PUBLICATIONS

Japanese Notification of Reasons for Refusal for Japanese Application No. 2016-547193, dated Oct. 8, 2019, with translation, 15 pages.

FRESH WATER PRODUCTION DEVICE AND METHOD FOR OPERATING FRESH WATER PRODUCTION DEVICE

CROSS REFERENCE TO RELATED APPLICATIONS

This is the U.S. National Phase application of PCT/JP2016/066772, filed Jun. 6, 2016, which claims priority to Japanese Patent Application No. 2015-116428, filed Jun. 9, 2015, the disclosures of these applications being incorporated herein by reference in their entireties for all purposes.

TECHNICAL FIELD OF THE INVENTION

The present invention relates to a fresh-water production apparatus in which raw water is treated with a pretreatment mechanism to produce pretreated water and the pretreated water is treated with a desalting mechanism to produced fresh water, and further relates to a method for operating the fresh-water production apparatus.

BACKGROUND OF THE INVENTION

Fresh-water production apparatus including a semipermeable membrane module for use in seawater desalination are being increasingly used in various fields because the apparatus have the merits of energy saving and space saving. Examples thereof include application to water purification processes for producing industrial water or tap water from river water, ground water, or water obtained by treating sewage or wastewater and application to semipermeable-membrane treatment steps for the reuse of sewage or wastewater and to semipermeable-membrane treatment steps for seawater desalination. The semipermeable-membrane separation device for use in seawater desalination, etc. basically has a configuration in which pretreated water which has undergone a pretreatment such as, for example, removal of suspended components is pressurized to a given pressure with a high-pressure pump and supplied to a semipermeable-membrane module and dissolved components of the liquid being treated are separated by the reverse osmosis function of the semipermeable-membrane module to obtain a permeate.

Examples of the pretreatment include sand filtration and membrane filtration, and it is especially preferred to use membrane filtration. As a pretreatment mechanism, use is made of a pretreatment membrane module including microfiltration membranes or ultrafiltration membranes. As shown in FIG. 13, a method has hitherto been used in which raw water retained in a raw-water tank 3 is supplied to a pretreatment mechanism 1 with a raw-water feed pump 4 and the pretreated water obtained is temporarily retained in an intermediate tank 18 and is then supplied with a high-pressure pump 6 to the semipermeable-membrane module 7 of a desalting mechanism 2 and treated therewith. This method, however, has a drawback in that microorganisms grow in the intermediate tank 18 and the semipermeable-membrane module 7 is prone to be fouled thereby. In addition, there are cases where the disposition of the intermediate tank 18 makes the suction pressure of the high-pressure pump 6 insufficient and this necessitates disposition of a booster pump 19 on the feed side of the high-pressure pump 6, resulting in an excess equipment cost.

In order to overcome such problems, techniques have been proposed in which pretreated water is supplied from the pretreatment modules directly to a desalting mechanism and treated (see Patent Documents 1, 2, and 3). A feature of these proposals resides in that there is no need of disposing the intermediate tank 18 which has been necessary so far.

Meanwhile, in cases when pretreatment membrane modules are continuously used for filtration, the substances to be removed, such as suspended matter, organic substances, and inorganic substances, that are contained in the raw water accumulate in the pretreatment membrane modules to increase the filtration resistance thereof, finally making it impossible to continue the filtration. For inhibiting such increase in the filtration resistance of pretreatment membrane modules, it is necessary to conduct, for example, physical washing such as back-pressure washing in which membrane-filtrated water or clarified water is forced by pressure into the modules in the direction reverse to the filtration direction to remove the fouling components accumulated on the membrane surfaces and in membrane pores, air scrubbing in which bubbles are introduced to the raw-water side of the membranes (raw-water side) to vibrate the membranes and bring the membranes into contact with one another, thereby scraping off adherent substances from the membrane surfaces, or flushing in which raw water is introduced to the raw-water side of the membranes without performing filtration, thereby removing fouling substances.

Furthermore, since polluted water remains in the raw-water-side portions of the pretreatment membrane modules after such washing, a general procedure is to discharge the water remaining in the pretreatment membrane modules and newly supply raw water. (Hereinafter, the series of operations is often referred to collectively as "washing step".) During this washing step, one line or limited lines of the multiple lines of the pretreatment mechanism are kept isolated from the filtration lines.

In the case where there is no intermediate tank, the pretreatment mechanism is directly connected to the desalting mechanism. Because of this, there is a concern that when the pretreatment membrane modules shift from a filtration step to a washing step or shift from a washing step to a filtration step, the pressure at which the pretreated water is forced into the desalting mechanism (pressure of the pretreated water) might fluctuate to impair stable operation of the desalting mechanism and cause damage to the pretreatment modules and the pump.

In order to overcome such a problem, a fresh-water production apparatus has been proposed in Patent Document 3, the fresh-water production apparatus including, as shown in FIG. 14, a pretreatment mechanism 1 provided with a pressure control valve CV1 which serves to keep the pressure of the pretreated water constant and flow rate control valves CV2 for controlling the flow rate of raw water being supplied to pretreatment membrane modules 5.

PATENT DOCUMENT

Patent Document 1: JP-A-10-263539
Patent Document 2: JP-A-2007-181822
Patent Document 3: WO 2013/039224

SUMMARY OF THE INVENTION

However, in the fresh-water production apparatus proposed in Patent Document 3, when performing step shifts in the pretreatment mechanism or when performing supply of raw water or flushing during a washing step, it has been necessary to slowly open or close the raw-water flow rate control valves or filtration valves in order to inhibit the pretreated water from fluctuating in pressure. There has hence been a problem in that the step shift period or the washing step period is undesirably prolonged and the filtration amount (load) for the other lines of the pretreatment membrane modules, where washing is not being performed, increases, resulting in accelerated membrane fouling. In addition, even with the technique in which the raw-water flow rate control valves or the filtration valves are slowly opened or closed, it is difficult to eliminate the pressure fluctuations of the pretreated water. There has hence been a desire for a technique for minimizing the pressure fluctuations.

Accordingly, an object of the present invention is to provide a fresh-water production apparatus in which pretreated water obtained by filtrating raw water by a pretreatment mechanism including pretreatment membrane modules is directly supplied to a desalting mechanism without via an intermediate tank and which can be operated with a shortened washing step period for the pretreatment mechanism while inhibiting the pretreated water from fluctuating in pressure, thereby stably operating the desalting mechanism. Another object thereof is to provide a method for operating the fresh-water production apparatus.

The fresh-water production apparatus of the present invention and the method for operating the fresh-water production apparatus have the following features for overcoming the problems described above.

(1) A fresh-water production apparatus according to one aspect of the present invention is a fresh-water production apparatus including: a pretreatment mechanism including a plurality of lines each including a pretreatment membrane module for filtrating raw water to produce pretreated water; and a desalting mechanism including a semipermeable-membrane module for producing fresh water from the pretreated water supplied thereto, in which the pretreatment mechanism includes, on the raw-water side in each line, a raw-water feed valve capable of being regulated with respect to opening/closing speed, and includes, on the pretreated-water side in each line, a filtration valve capable of being regulated with respect to opening/closing speed, and the fresh-water production apparatus further includes a filtration initiation step control mechanism which (i) at the time of filtration initiation, initiates an operation of opening the raw-water feed valve while regulating an opening speed of the raw-water feed valve to inhibit the pretreated water from fluctuating in pressure and initiates an operation of opening the filtration valve after the pretreatment membrane module has come to have a raw-water-side pressure not lower than a given pressure or after the raw-water feed valve has come to have a given degree of opening or higher, or which (ii) initiates the operation of opening the filtration valve and initiates the operation of opening the raw-water feed valve after the pretreatment membrane module has come to have a raw-water-side pressure not lower than a given pressure or after the filtration valve has come to have a given degree of opening or higher.

(2) A preferable embodiment of a fresh-water production apparatus of the present invention is the fresh-water production apparatus according to (1), including: a high-pressure pump for directly supplying the pretreated water to the desalting mechanism; a first connecting pipeline in which one end thereof has been connected to each of the lines of the pretreatment mechanism and the other end thereof has been connected to the high-pressure pump; a second connecting pipeline in which one end thereof has been connected to the high-pressure pump and the other end thereof has been connected to the desalting mechanism; and a permeate pipeline and a concentrate drainage pipeline in each of which one end has been connected to the desalting mechanism.

(3) A preferable embodiment of a fresh-water production apparatus of the present invention is the fresh-water production apparatus according to (1) or (2), including a filtration termination step control mechanism which (i) closes the raw-water feed valve at a closing speed regulated so as to inhibit the pretreated water from fluctuating in pressure and initiates an operation of closing the filtration valve after the raw-water feed valve has come to have a given degree of opening or lower, or which (ii) closes the filtration valve at a closing speed regulated so as to inhibit the pretreated water from fluctuating in pressure and initiates an operation of closing the raw-water feed valve after the filtration valve has come to have a given degree of opening or lower.

(4) A preferable embodiment of a fresh-water production apparatus of the present invention is the fresh-water production apparatus according to any one of (1) to (3), including a washing step control mechanism which opens the raw-water feed valve at an opening speed regulated so as to inhibit the pretreated water from fluctuating in pressure, until the raw-water feed valve comes to have a given degree of opening or higher or the raw water comes to flow at a given flow rate or higher, and which thereafter performs control of the raw-water flow rate by a PID operation to supply the raw water and closes the raw-water feed valve, after the lapse of a given time period, at a closing speed regulated so as to inhibit the pretreated water from fluctuating in pressure.

(5) A preferable embodiment of a fresh-water production apparatus of the present invention is the fresh-water production apparatus according to any one of (1) to (3), in which the pretreatment mechanism includes: a first water feed mechanism that is for supplying the raw water to the pretreatment mechanism and includes a raw-water feed pump for supplying at least the raw water and a raw-water feed pipeline in which one end thereof has been connected to the raw-water feed pump and the other end thereof has been connected to each of the lines of the pretreatment mechanism; and a second water feed mechanism which supplies either the raw water or feed water that is water to be treated which is different from the raw water, to the pretreatment mechanism separately from the first water feed mechanism.

(6) A preferable embodiment of a fresh-water production apparatus of the present invention is the fresh-water production apparatus according to (5), in which the second water feed mechanism includes a water feed pipeline which has branched off from a concentrate drainage pipeline and in which one end thereof has been connected to each of the lines of the pretreatment mechanism.

(7) Another aspect of the present invention for operating a fresh-water production apparatus is a method for operating a fresh-water production apparatus including: a pretreatment mechanism including a plurality of lines each including a pretreatment membrane module for filtrating raw water to produce pretreated water; and a desalting mechanism including a semipermeable-membrane module for producing fresh water from the pretreated water supplied thereto, in which the pretreatment mechanism includes, on the raw-water side in each line, a raw-water feed valve capable of being regulated with respect to opening/closing speed, and includes, on the pretreated-water side in each line, a filtration valve capable of being regulated with respect to opening/closing speed, and (i) control is performed at the time of filtration initiation to initiate an operation of opening the raw-water feed valve, while regulating an opening speed of the raw-water feed valve to inhibit the pretreated water from fluctuating in pressure, and initiate an operation of opening the filtration valve after the pretreatment membrane module has come to have a raw-water-side pressure not lower than a given pressure or after the raw-water feed valve has come to have a given degree of opening or higher, or (ii) control is performed to initiate the operation of opening the filtration valve and initiate the operation of opening the raw-water feed valve after the pretreatment membrane module has come to have a raw-water-side pressure not lower than a given pressure or after the filtration valve has come to have a given degree of opening or higher.

(8) Another aspect of the present invention for operating a fresh-water production apparatus is the method for operating a fresh-water production apparatus according to (7), in which the fresh-water production apparatus includes: a high-pressure pump for supplying the pretreated water to the desalting mechanism; a first connecting pipeline in which one end thereof has been connected to each of the lines of the pretreatment mechanism and the other end thereof has been connected to the high-pressure pump; a second connecting pipeline in which one end thereof has been connected to the high-pressure pump and the other end thereof has been connected to the desalting mechanism; and a permeate pipeline and a concentrate drainage pipeline in each of which one end has been connected to the desalting mechanism, and the pretreated water is directly supplied to the desalting mechanism with the high-pressure pump to produce fresh water.

(9) Another aspect of the present invention for operating a fresh-water production apparatus is the method for operating a fresh-water production apparatus according to (7) or (8), in which the raw-water feed valve is closed at a closing speed regulated so as to inhibit the pretreated water from fluctuating in pressure and an operation of closing the filtration valve is initiated after the raw-water feed valve has come to have a given degree of opening or lower, or the filtration valve is closed at a closing speed regulated so as to inhibit the pretreated water from fluctuating in pressure and an operation of closing the raw-water feed valve is initiated after the filtration valve has come to have a given degree of opening or lower.

(10) Another aspect of the present invention for operating a fresh-water production apparatus is the method for operating a fresh-water production apparatus according to any one of (7) to (9), in which the raw-water feed valve is opened at an opening speed regulated so as to inhibit the pretreated water from fluctuating in pressure, until the raw-water feed valve comes to have a given degree of opening or higher or the raw water comes to flow at a given flow rate or higher, thereafter control of the raw-water flow rate is performed by a PID operation to supply the raw water, and the raw-water feed valve is closed, after the lapse of a given time period, at a closing speed regulated so as to inhibit the pretreated water from fluctuating in pressure.

(11) Another aspect of the present invention for operating a fresh-water production apparatus is the method for operating a fresh-water production apparatus according to any one of (7) to (9), in which the pretreatment mechanism includes: a first water feed mechanism that is for supplying the raw water to the pretreatment mechanism and includes a raw-water feed pump for supplying at least the raw water and a raw-water feed pipeline in which one end thereof has been connected to the raw-water feed pump and the other end thereof has been connected to each of the lines of the pretreatment mechanism; and a second water feed mechanism which supplies either the raw water or feed water that is water to be treated which is different from the raw water, to the pretreatment mechanism separately from the first water feed mechanism, and in a filtration step of producing pretreated water, the first water feed mechanism is utilized to supply the raw water to one or more targeted lines of the pretreatment mechanism, and in at least a part of a washing step of washing the pretreatment membrane modules, the second water feed mechanism is utilized to supply the feed water to one or more targeted lines of the pretreatment mechanism.

(12) Another aspect of the present invention for operating a fresh-water production apparatus is the method for operating a fresh-water production apparatus according to (11), in which the second water feed mechanism includes a water feed pipeline which has branched off from a concentrate drainage pipeline and in which one end thereof has been connected to each of the lines of the pretreatment mechanism, and in a step of washing the pretreatment mechanism, a drain discharged through the concentrate drainage pipeline is supplied as the feed water.

According to the present invention, since a pretreatment mechanism can be operated while inhibiting the pretreated water from fluctuating in pressure, a fresh-water production apparatus is obtained in which the desalting mechanism can be stably operated. Furthermore, the period of water supply or flushing in the step of washing the pretreatment mechanism can be shortened, and the load on the lines where washing is not being performed is hence reduced. Consequently, a fresh-water production apparatus is obtained in which the pretreatment mechanism can be operated while inhibiting the pretreatment membranes from being fouled.

DETAILED DESCRIPTION OF EMBODIMENTS OF THE INVENTION

Figure 1:
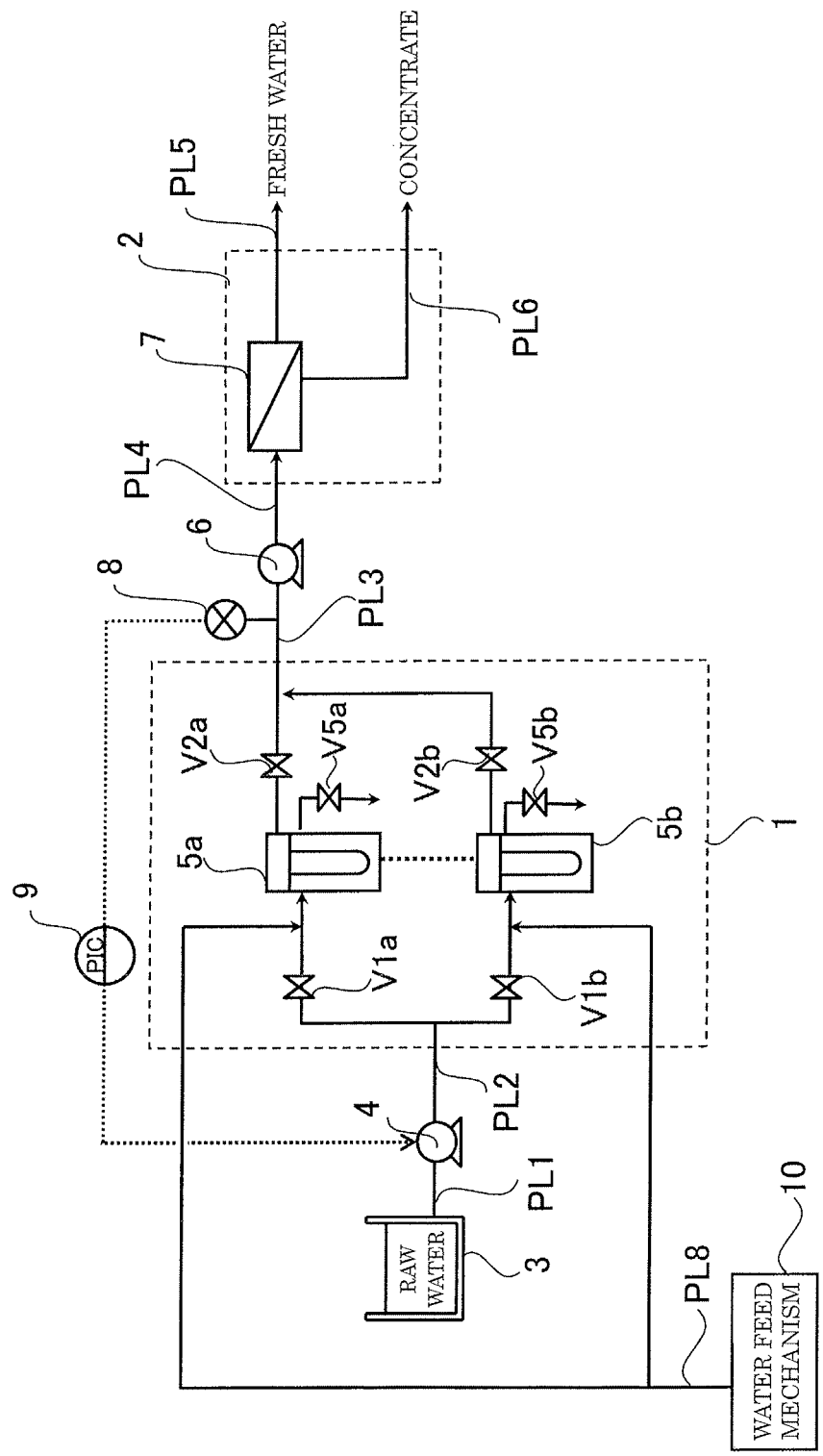
FIG. 1 is an apparatus flowchart diagrammatically showing an embodiment of the fresh-water production apparatus of the present invention.

Next, the fresh-water production apparatus of the present invention is explained in more detail on the basis of the embodiments shown in the drawings. However, the present invention should not be construed as being limited to these embodiments.

Figure 2:
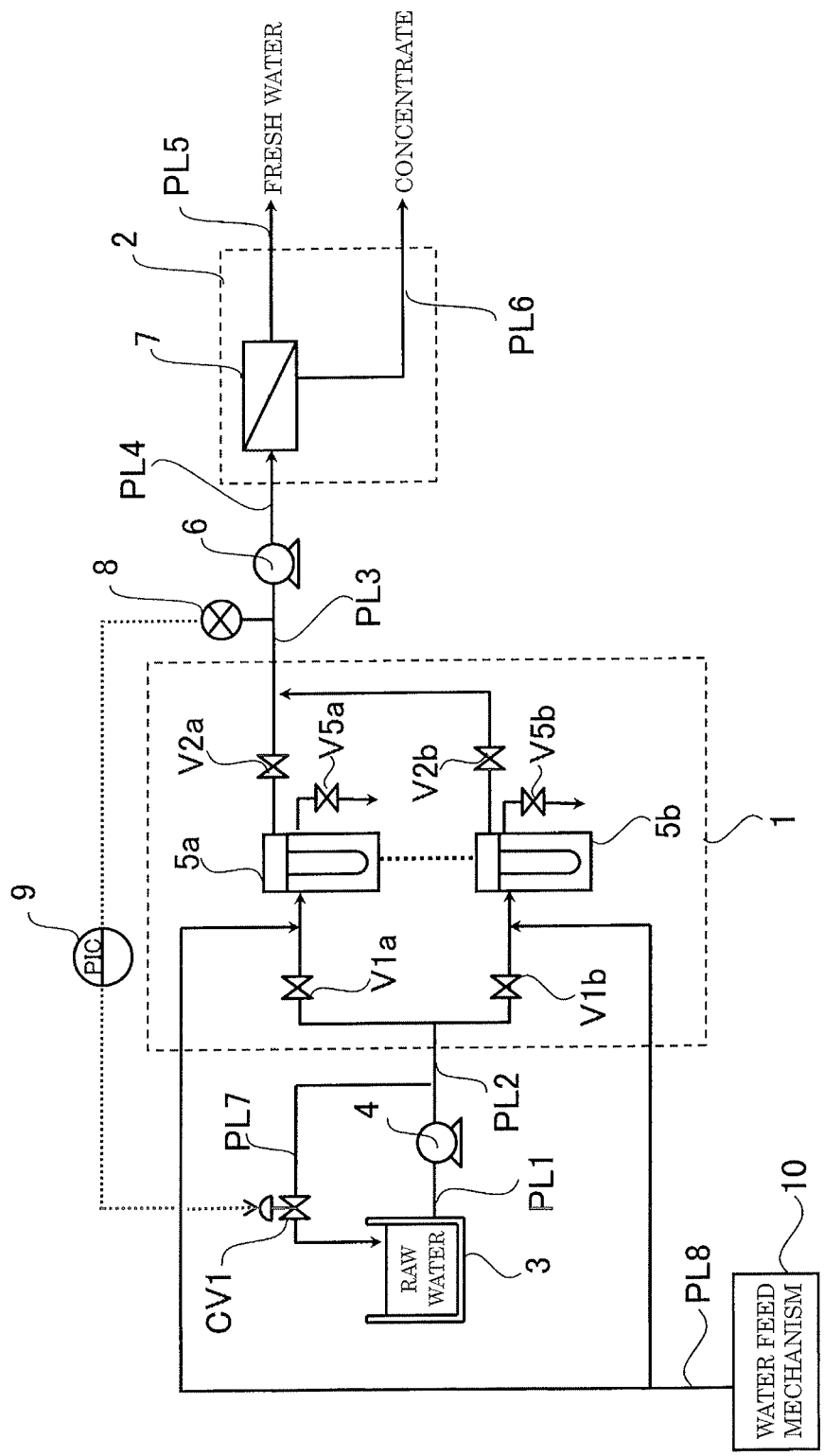
FIG. 2 is an apparatus flowchart diagrammatically showing another embodiment of the fresh-water production apparatus of the present invention.

As shown, for example, in FIG. 1 or 2, the fresh-water production apparatus of the present invention includes: a pretreatment mechanism 1 including a plurality of lines for treating raw water to produce pretreated water and including pretreatment membrane modules 5 (5a, 5b); and a desalting mechanism 2 including a semipermeable-membrane module 7 for treating the pretreated water to produce fresh water. This fresh-water production apparatus is further includes: a first water feed mechanism including a raw-water feed pump 4 for supplying the raw water to the pretreatment mechanism 1, a first raw-water feed pipeline PL1 in which one end thereof has been connected to the raw-water tank 3 and the other end thereof has been connected to the raw-water feed pump 4, and a second raw-water feed pipeline PL2 in which one end thereof has been connected to the raw-water feed pump 4 and the other end thereof has been connected to each of the lines of the pretreatment mechanism 1; and a second water feed mechanism 10 which supplies, separately from the first water feed mechanism, either raw water or feed water that is water to be treated and is different from the raw water, and which includes a high-pressure pump 6 for supplying the pretreated water to the semipermeable-membrane module 7, a first connecting pipeline PL3 in which one end thereof has been connected to the pretreatment mechanism 1 and the other end thereof has been connected to the high-pressure pump 6, a second connecting pipeline PL4 in which one end thereof has been connected to the high-pressure pump 6 and the other end thereof has been connected to the desalting mechanism 2, a permeate pipeline PL5 and a concentrate drainage pipeline PL6 in each of which one end has been connected to the desalting mechanism 2, a manometer 8 which has been provided on the first connecting pipeline PL3 and which measures the pressure of the pretreated water being supplied to the high-pressure pump 6, and a pressure control mechanism for keeping the pressure constant.

Each line of the pretreatment mechanism 1 includes, on the raw-water side, a raw-water feed valve V1 which is open during raw-water supply and is capable of being regulated with respect to opening/closing speed and a backwash drainage valve V5 which is closed during filtration. Each line further includes, on the pretreated-water side, a filtration valve V2 which is open during filtration and is capable of being regulated with respect to opening/closing speed.

Furthermore, the fresh-water production apparatus includes a control mechanism (arithmetic unit or computer) for controlling the operation so that a filtration initiation step, a filtration step, a filtration termination step, and a washing step for washing the pretreatment mechanism 1 (pretreatment membrane modules 5a, 5b) are periodically repeated. In the filtration initiation step, (i) the raw-water feed valves V1, backwash drainage valves V5, and filtration valves V2 which are in the closed state are operated in such a manner that the operation of opening the raw-water feed valves V1 is initiated while regulating the opening speed of the raw-water feed valves V1 to inhibit the pretreated water from fluctuating in pressure and the operation of opening the filtration values V2 is initiated after the pretreatment membrane modules 5a and 5b have come to have a raw-water-side pressure not lower than a give pressure (the manometer is not shown in the drawings) or after the raw-water feed valves V1 have come to have a given degree of opening or higher, or (ii) the operation of opening the filtration valves V2 is initiated and the operation of opening the raw-water feed valves V1 is initiated after the pretreatment membrane modules 5a and 5b have come to have a raw-water-side pressure not lower than a given pressure or after the filtration valves V2 have come to have a given degree of opening or higher. During the filtration step, the raw-water feed valves V1 are kept open, the backwash drainage valves V5 are kept closed, and the filtration valves V2 are kept open. In the filtration termination step, (i) the raw-water feed valves V1 are closed at a closing speed regulated so as to inhibit the pretreated water from fluctuating in pressure and the filtration valves V2 are closed after the raw-water feed valves V1 have come to have a given degree of opening or lower, or (ii) the filtration valves V2 are closed at a closing speed regulated so as to inhibit the pretreated water from fluctuating in pressure and the raw-water feed valves V1 are closed after the filtration valves V2 have come to have a given degree of opening or lower, after performing either control, the backwash drainage valves V5 are opened. The control mechanism functions as a filtration initiation step control mechanism in the filtration initiation step, as a filtration step control mechanism in the filtration step, as a filtration termination step control mechanism in the filtration termination step, and as a washing step control mechanism in the washing step.

In the case of an embodiment which does not include the second water feed mechanism 10, it is preferable that this fresh-water production apparatus includes a control mechanism which opens the raw-water feed valves V1 at an opening speed regulated so as to inhibit the pretreated water from fluctuating in pressure, until the raw-water feed valves V1 come to have a given degree of opening or higher or the raw water comes to flow at a given rate or higher, and which thereafter performs control of the raw-water flow rate by a PID (proportional-integral-differential) operation to supply the raw water and closes the raw-water feed valves V1, after the lapse of a given time period, at a closing speed regulated so as to inhibit the pretreated water from fluctuating in pressure. The pretreatment mechanism 1 further has a control mechanism whereby at least one line other than the line(s) where the washing step is conducted is made to continuously perform the filtration step.

The pressure control mechanism is not particularly limited. However, the pressure control mechanism can have a configuration including an inverter and a pressure control part 9 both for controlling the output of the raw-water feed pump 4 so as to keep the pressure of the treated water constant, as shown in FIG. 1, or a configuration including a bypass pipeline PL7 which has branched off from the second raw-water feed pipeline PL2 and is for discharging raw water from the system, a pressure control valve CV1 provided on the bypass pipeline PL7 and serving to regulate the pressure of the pretreated water so as to be constant, and a pressure control part 9, as shown in FIG. 2.

In the configuration shown in FIG. 2, raw water is returned to the raw-water tank 3 through the bypass pipeline PL7. The pretreatment mechanism 1 therein includes a plurality of lines, and raw water is supplied to the plurality of lines from one raw-water tank 3. Consequently, when using a wording such as "lines where filtration is being conducted or lines where washing is being conducted among the plurality of lines of the pretreatment mechanism 1", the term "lines" mechanism a range which does not include the raw-water tank. In view of this, to return raw water to the raw-water tank 3 through the bypass pipeline PL7 is expressed by the wording "raw water is discharged from the system.

In cases when there are raw-water tanks respectively for the multiple lines or where the term "lines" is used for a range including the raw-water tank, then to return raw water to the raw-water tank 3 through the bypass pipeline PL7 is expressed by the wording "raw water is returned to the raw-water tank(s)".

Figure 3:
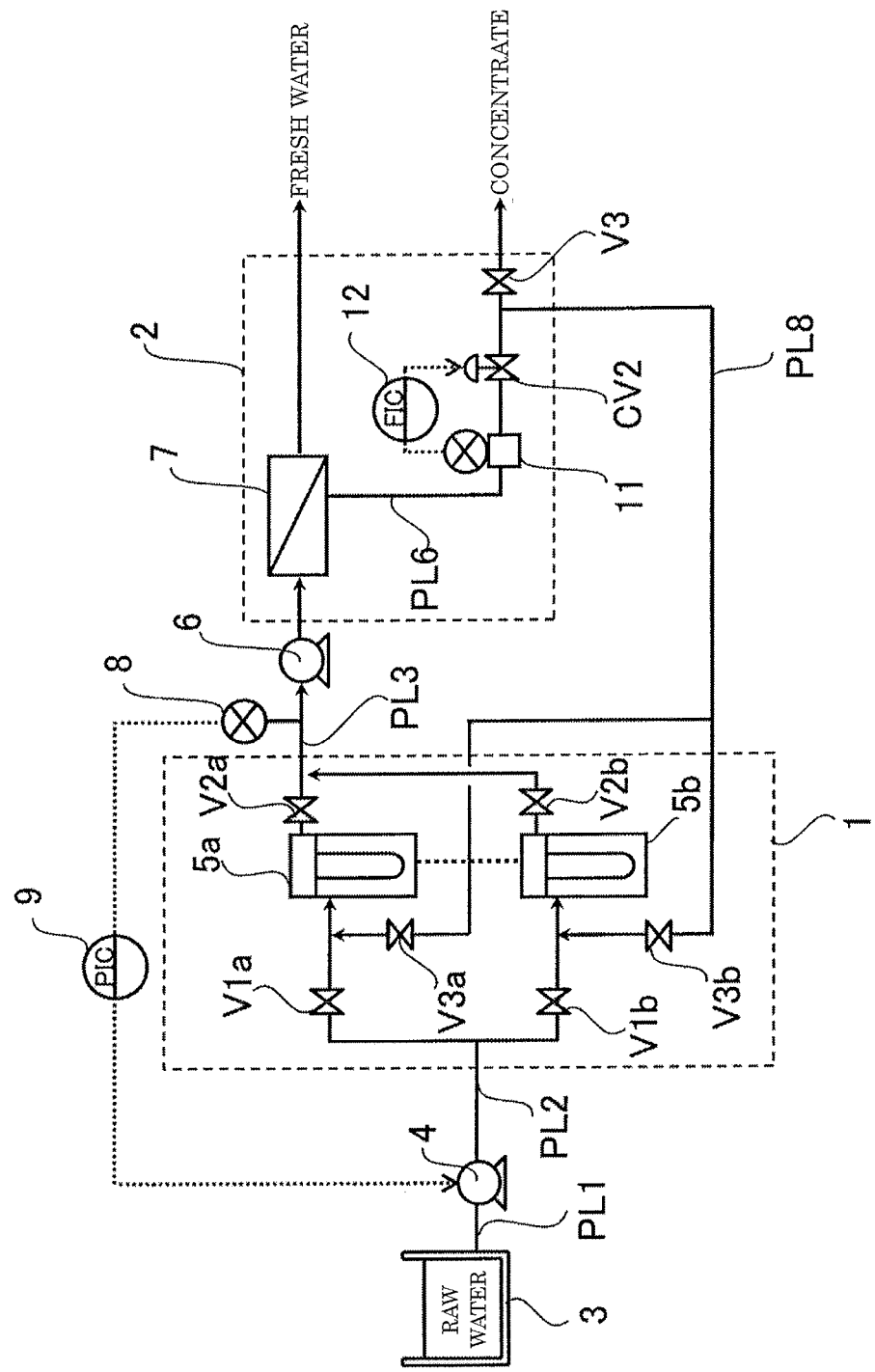
FIG. 3 is an apparatus flowchart diagrammatically showing still another embodiment of the fresh-water production apparatus of the present invention.
Figure 4:
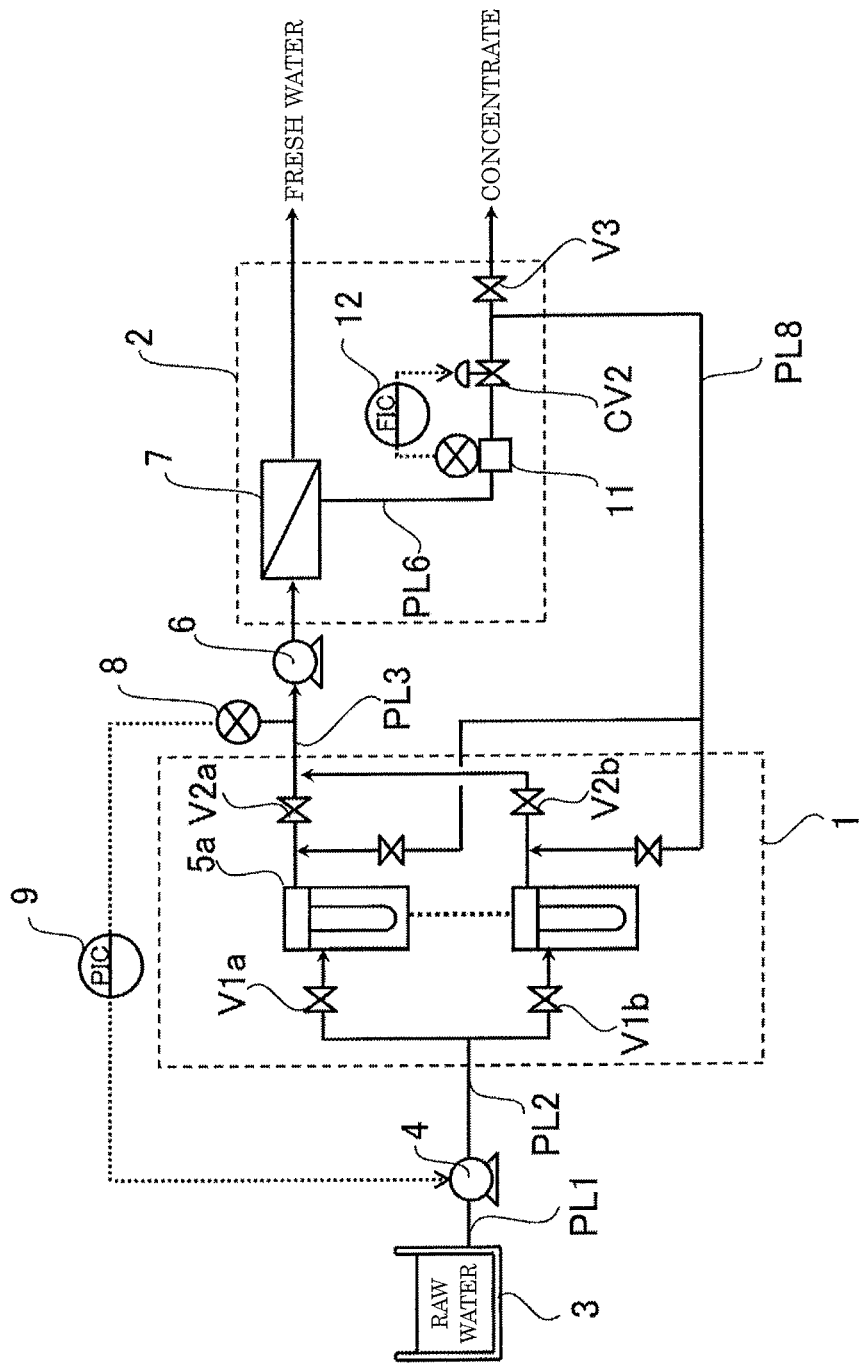
FIG. 4 is an apparatus flowchart diagrammatically showing still another embodiment of the fresh-water production apparatus of the present invention.

Next, specific examples of the second water feed mechanism 10 according to the present invention are explained by reference to FIGS. 3 to 9. In a first embodiment of the second water feed mechanism 10 according to the present invention, a concentrate discharged from the desalting mechanism 2 is utilized as feed water. Specifically, as shown in FIG. 3, a flow meter 11 for measuring the flow rate of the concentrate and a flow rate control valve CV2 and a flow rate control part 12 both for controlling the flow rate have been provided on the concentrate drainage pipeline PL6 of the desalting mechanism 2, and this second water feed mechanism 10 further includes a water feed pipeline PL8 which branches off from the concentrate drainage pipeline PL6 and in which one end thereof has been connected to the raw-water-side portions of the pretreatment membrane modules 5a and 5b. The water feed pipeline PL8 may be connected to the pretreated-water-side portions of the pretreatment membrane modules 5a and 5b, as shown in FIG. 4.

Water feed valves V3, V3a, and V3b for channel switching have been provided on the water feed pipeline PL8 and the concentrate drainage pipeline PL6, and some or all of the concentrate is supplied to the raw-water-side portions of the pretreatment membrane modules when supplying water or performing flushing in the step of washing the pretreatment mechanism 1. Since the pressure of the concentrate is reused, there is no need of newly disposing a pump, and the concentrate, which has conventionally been discharged from the system, can be effectively utilized and supplied to the pretreatment mechanism 1. Hence, the recovery of water produced (productivity) improves. The mode in which the water feed pipeline PL8 has been connected to the pretreated-water-side portions of the pretreatment membrane modules is preferred because this mode not only has the effect of energy saving but also enables the pretreatment membranes to be washed by backwash.

Figure 5:
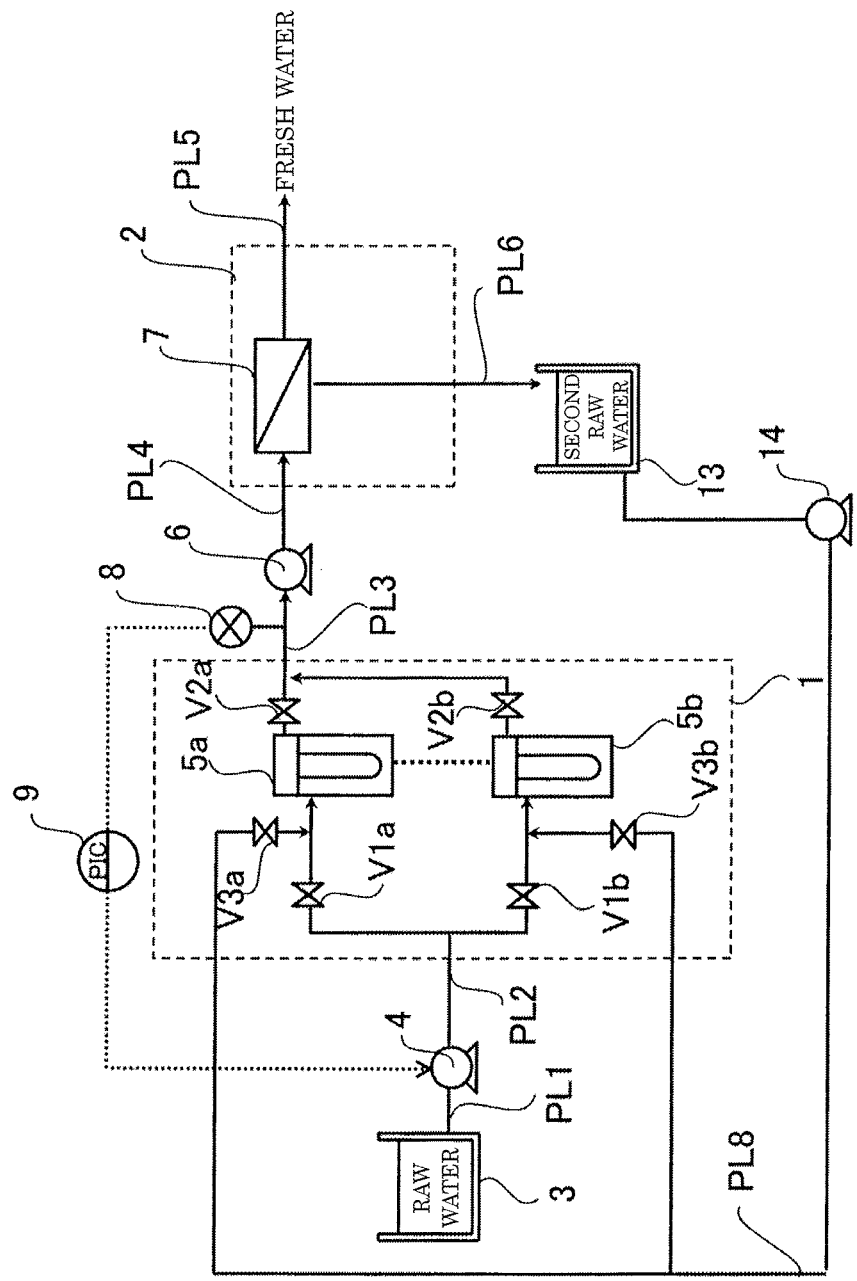
FIG. 5 is an apparatus flowchart diagrammatically showing still another embodiment of the fresh-water production apparatus of the present invention.
Figure 6:
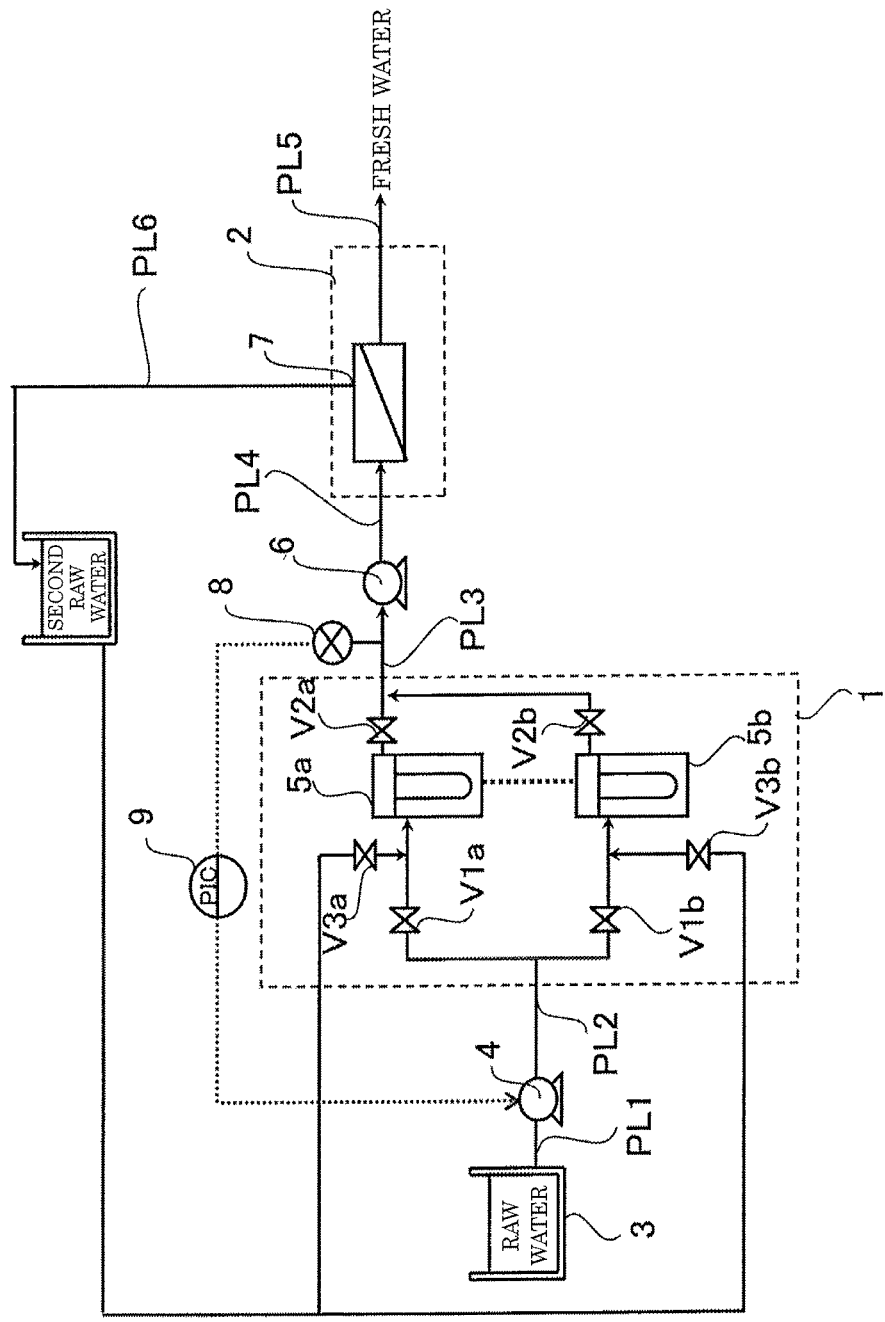
FIG. 6 is an apparatus flowchart diagrammatically showing still another embodiment of the fresh-water production apparatus of the present invention.

In a second embodiment of the second water feed mechanism 10 according to the present invention, water to be treated which is different from the raw water is utilized as feed water. Specifically, as shown in FIG. 5, this embodiment includes a second raw-water tank 13 for retaining the feed water therein and a water feed pipeline PL8 in which one end thereof has been connected to the second raw-water tank 13 and the other end thereof has been connected to the raw-water-side portions of the pretreatment membrane modules 5a and 5b. A water feed pump 14 and water feed valves V3a and V3b which are open during water supply are provided on the water feed pipeline PL8. As a supply mechanism of the feed water, use may be made of a mode in which the second raw-water tank 13 is disposed above the pretreatment mechanism 1 as shown in FIG. 6 and the feed water is supplied to the pretreatment membrane modules 5a and 5b by utilizing a difference in water head level without using the water feed pump 14. This mode is preferred because new equipment or power is not necessary.

As the water to be treated (feed water) which is different from the raw water, use can be made of fresh water produced by the desalting mechanism 2, concentrate discharged from the desalting mechanism, drain such as flushing drain, raw water discharged through the bypass pipeline PL7 in order to control the pressure of the pretreated water, or pretreated water obtained by the treatment with the pretreatment mechanism 1. In cases when the raw water discharged through the bypass pipeline PL7, concentrate discharged from the desalting mechanism, or flushing drain is used as the feed water, the amount of water to be discharged can be reduced. This mode is hence preferred.

In the case where a backwash-water tank 16 is disposed in order to wash the pretreatment mechanism 1 by backwash, the second raw-water tank 13 can be used also as the backwash-water tank 16, although not shown in the drawing. In this case, it is preferable that the feed water (backwash water) is the pretreated water or the fresh water produced by the desalting mechanism 2.

Figure 7:
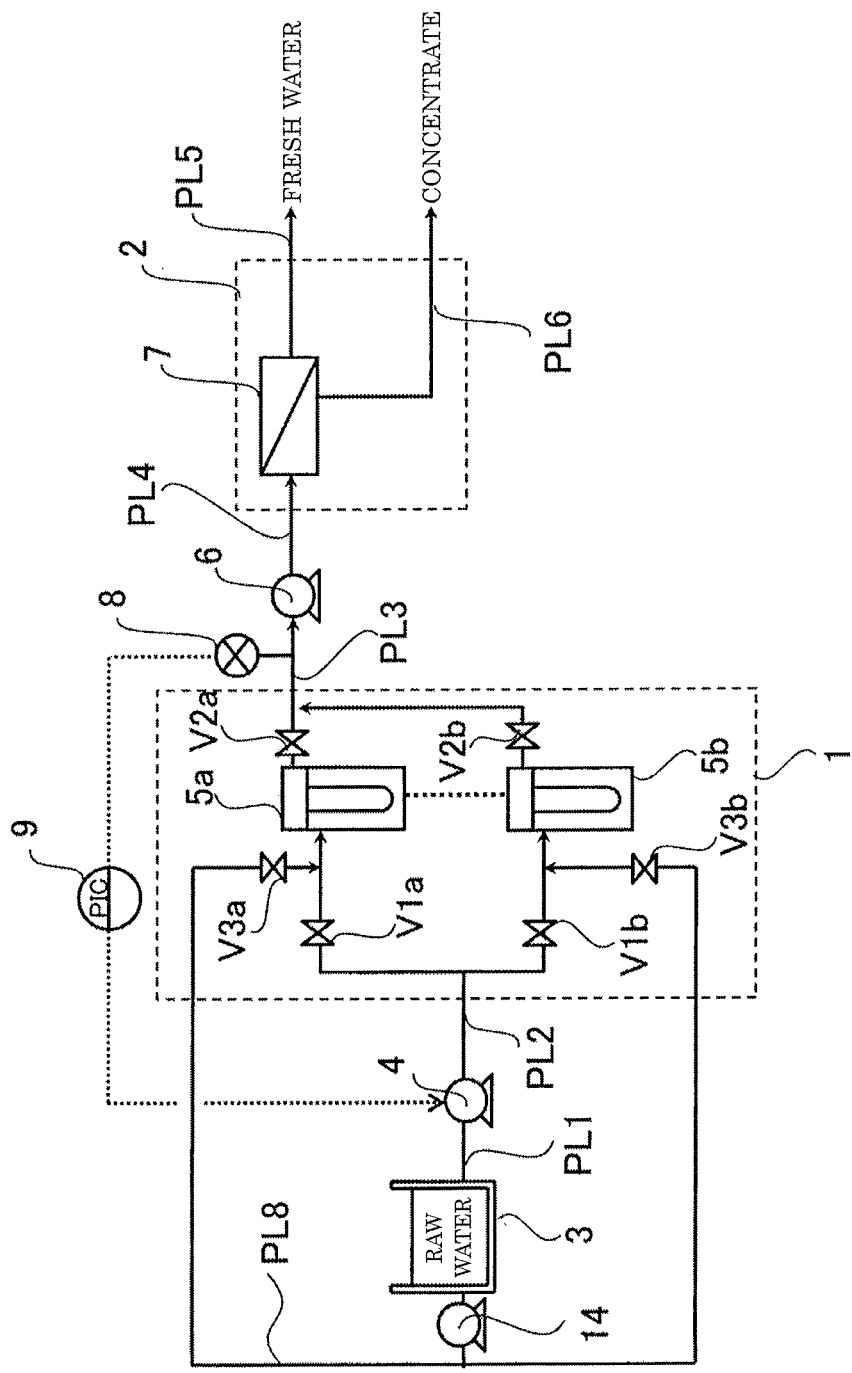
FIG. 7 is an apparatus flowchart diagrammatically showing still another embodiment of the fresh-water production apparatus of the present invention.

In a third embodiment of the second water feed mechanism according to the present invention, the raw water is utilized. As shown in FIG. 7, this embodiment includes a water feed pipeline PL8 in which one end thereof has been connected to the raw-water tank 3 and the other end thereof has been connected to the raw-water-side portions of the pretreatment membrane modules 5a and 5b. A water feed pump 14 and water feed valves V3a and V3b which are open during water supply are provided on the water feed pipeline PL8.

Figure 8:
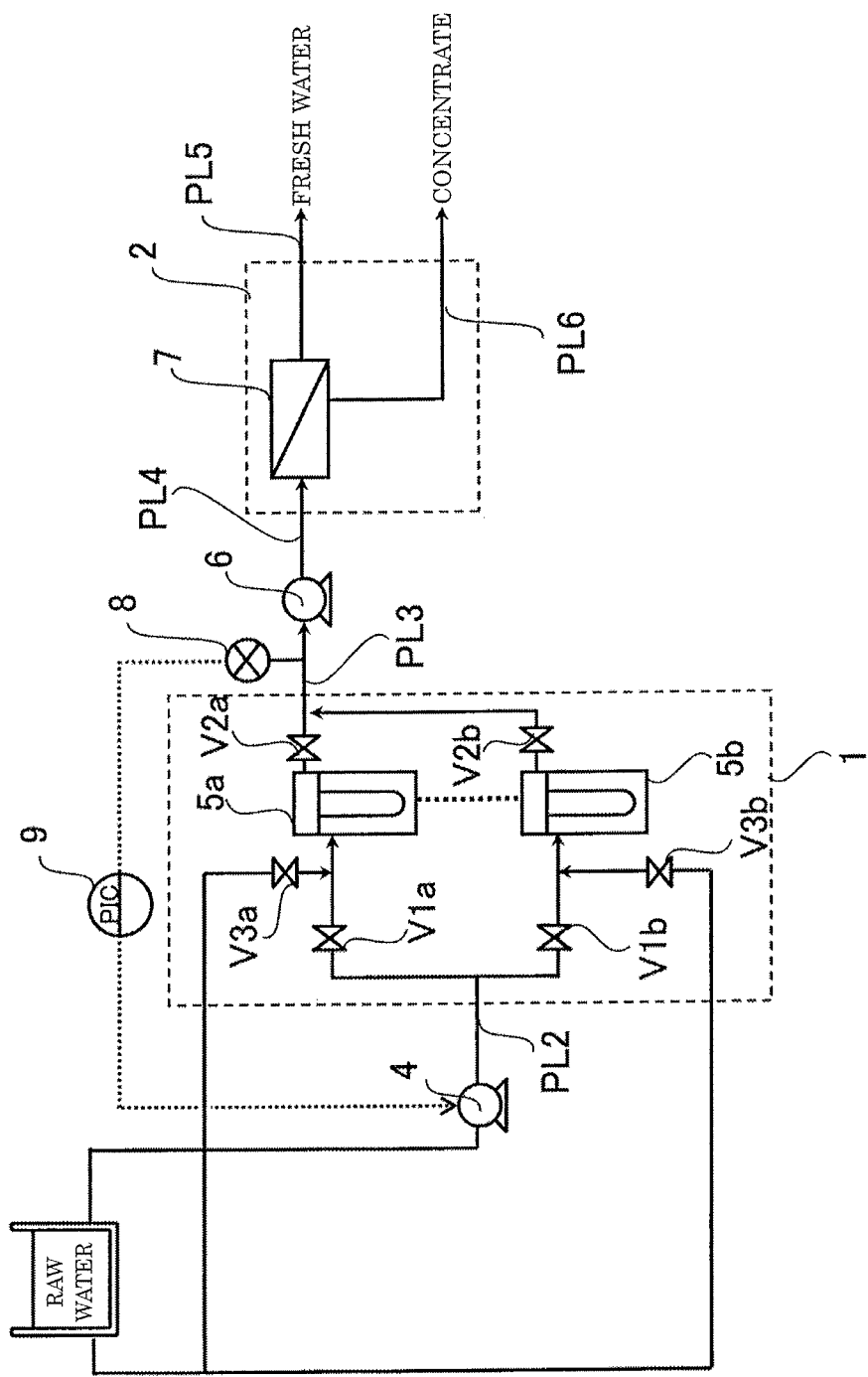
FIG. 8 is an apparatus flowchart diagrammatically showing still another embodiment of the fresh-water production apparatus of the present invention.

As a supply mechanism of the raw water, use may be made of a mode in which the raw-water tank 3 is disposed above the pretreatment mechanism 1 as shown in FIG. 8 to supply the raw water by utilizing a difference in water head level without using the water feed pump 14. This mode is preferred from the standpoints of equipment cost reduction and space saving because there is no need of newly disposing a second raw-water tank.

Figure 9:
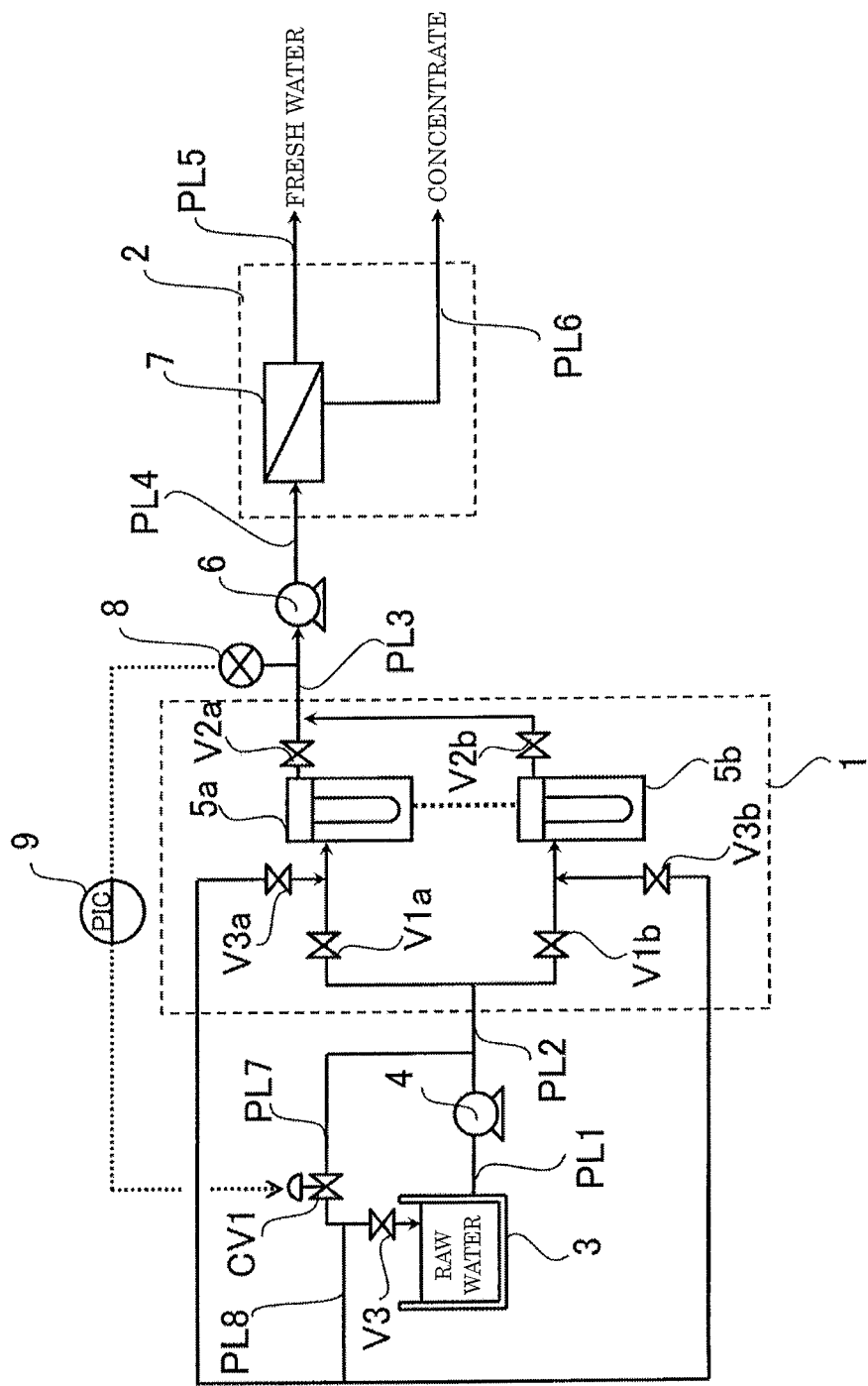
FIG. 9 is an apparatus flowchart diagrammatically showing still another embodiment of the fresh-water production apparatus of the present invention.

In a fourth embodiment of the second water feed mechanism 10 according to the present invention, the raw water discharged from the system through the bypass pipeline PL7 for controlling the pressure of the pretreated water in the pretreatment mechanism 1 is directly utilized as feed water for use in the step of washing the pretreatment mechanism 1. Specifically, as shown in FIG. 9, this embodiment includes a water feed pipeline PL8 which branches off from the bypass pipeline PL7 and in which one end thereof has been connected to the raw-water-side portion of each of the pretreatment membrane modules 5a and 5b. Water feed valves V3, V3a, and V3b for switching the channel of the bypassed raw water are provided on the water feed pipeline PL8, and some or all of the bypassed raw water is supplied by operating the water feed valves to the raw-water-side portions of the pretreatment membrane modules 5a and 5b when supplying water to the pretreatment membrane modules or flushing the modules in the step of washing the pretreatment mechanism 1. Since the raw water discharged from the system can be effectively utilized and supplied to the pretreatment mechanism 1 without newly disposing a pump, which necessitates power, the recovery of water produced (productivity) improves.

The fresh-water production apparatus of the present invention can be operated in a mode in which the second water feed mechanism 10 is not utilized. In this case, the raw water supplied from the raw-water feed pump 4 is utilized in the following manner. The raw-water feed valves V1 are opened until the raw-water feed valves V1 come to have a given degree of opening or higher or until the raw water comes to flow at a given flow rate or higher, and control of the raw-water flow rate by a PID operation is then performed to supply the raw water to the raw-water-side portions of the pretreatment membrane modules 5a and 5b. After the raw water is supplied for a given time period, the operation of completely closing the raw-water feed valves V1 is performed.

Examples of the raw water to which the present invention is applicable include raw water of various kinds, such as seawater, river water, ground water, sewage, industrial wastewater, treated water obtained by treatments thereof, and mixtures of two or more of these.

It is preferable that the pretreatment mechanism 1 is a device including a plurality of lines of pretreatment membrane modules 5, from the standpoints of performance and washing step. However, a sand filtration device can be used in place of the pretreatment membrane modules 5. Preferred as the membranes for use in the pretreatment membrane modules 5 are, for example, microfiltration membranes capable of rejecting particles and polymeric compounds having a size of 0.1 m or larger and ultrafiltration membranes capable of rejecting particles and polymeric compounds having a size of 2 nm or larger but smaller than 0.1 μm.

With respect to the form of the microfiltration membranes and/or ultrafiltration membranes for use in the pretreatment membrane modules 5, use can be made of filtration membranes of the hollow-fiber membrane type, flat-sheet membrane type, spiral type, tubular type, etc. However, it is preferred to use filtration membranes of the hollow-fiber membrane type, from the standpoint of cost reduction.

With respect to the mode of membrane filtration, either dead end filtration type modules or cross flow filtration type modules may be employed. In a preferred embodiment, however, dead end filtration type modules are employed from the standpoint of low energy consumption. Although the filtration membrane modules may be either pressure type modules or immersion type modules, a preferred embodiment employs pressure type modules from the standpoint that high-flux operation is possible. Furthermore, the filtration membrane modules may be either the external-pressure type in which raw water is supplied to the outer side of the membranes to obtain a permeate on the inner side or the internal-pressure type in which raw water is supplied to the inner side of the membranes to obtain a permeate on the outer side. However, a preferred embodiment employs the external-pressure type from the standpoint of simplicity of the pretreatment.

Examples of the material of the microfiltration membranes and/or ultrafiltration membranes for use in the pretreatment membrane modules 5 include polysulfones, polyethersulfones, polyacrylonitrile, polyimides, polyetherimides, polyamides, polyetherketones, polyetheretherketones, polyethylene, polypropylene, ethylene/vinyl alcohol copolymers, cellulose, cellulose acetate, poly(vinylidene fluoride), ethylene/tetrafluoroethylene copolymers, polytetrafluoroethylene, and composite materials thereof. Of these, poly(vinylidene fluoride) is especially preferred as the material of the microfiltration membranes and/or ultrafiltration membranes, because this polymer has excellent chemical resistance and, hence, the filtration function of the microfiltration membranes and/or ultrafiltration membranes is recovered by periodically cleaning the microfiltration membranes and/or ultrafiltration membranes with a chemical, leading to a prolongation of the life of the pretreatment membrane modules.

Examples of the material of the cases of the pretreatment membrane modules 5 include polyolefin resins such as polyethylene, polypropylene, and polybutene, fluororesins such as polytetrafluoroethylene (PTFE), tetrafluoroethylene/perfluoroalkyl vinyl ether copolymers (PFA), fluoroethylene/polypropylene copolymers (FEP), ethylene/tetrafluoroethylene copolymers (ETFE), polychlorotrifluoroethylene (PCTFE), trifluorochloroethylene/ethylene copolymers (ECTFE), and poly(vinylidene fluoride) (PVDF), chlorinated resins such as poly(vinyl chloride) and poly(vinylidene chloride), and other resins including polysulfone resins, polyethersulfone resins, polyallylsulfone resins, poly(phenyl ether) resins, acrylonitrile/butadiene/styrene copolymer resins (ABS), acrylonitrile/styrene copolymer resins, poly(phenylene sulfide) resins, polyamide resins, polycarbonate resins, polyetherketone resins, and polyetheretherketone resins. One of these resins or a mixture of two or more of these resins may be used. Preferred materials other than these resins are aluminum, stainless steel, and the like. Also usable are a resin/metal composite and composite materials such as a glass-fiber-reinforced resin and a carbon-fiber-reinforced resin.

Meanwhile, the semipermeable-membrane module 7 in the desalting mechanism 2 according to the present invention is configured of a pressure vessel and, contained therein, one element or a plurality of serially connected elements, the elements each being a spiral element obtained by winding a flat-sheet membrane around a collection tube, a plate-and-frame type element in which plate type supports each having flat membranes applied to both surfaces thereof are stack at given intervals with spacers therebetween to form a module, a tubular type element employing a tubular membrane, or a hollow-fiber membrane element obtained by bundling hollow-fiber membranes and disposing the bundle in a case.

With respect to the type of elements, elements of any desired type may be used. In a preferred embodiment, however, spiral type elements are employed from the standpoints of operating efficiency and interchangeability. The number of elements can be set at will according to membrane performance. In the case of using spiral type elements, the number of elements to be packed in one module is preferably 1 to about 8, the elements being serially arranged. It is also possible to dispose a plurality of semipermeable-membrane modules 7 in parallel.

As the semipermeable membranes for constituting the semipermeable-membrane module 7, use can be made of semipermeable membranes having desalting performance, such as nanofiltration membranes or reverse osmosis membranes. As the material thereof, use can be made of a polyamide-based polymer, poly(piperazine-amide)-based polymer, poly(ester-amide)-based polymer, or a material obtained by crosslinking a water-soluble vinyl polymer with any of these polymers. With respect to membrane structure, use can be made, for example, of: a membrane which has a dense layer in at least one surface thereof and has micropores that gradually increase in diameter from the dense layer toward an inner portion of the membrane or toward the other surface (asymmetric membrane); or a membrane which includes such an asymmetric membrane and, formed on the dense layer thereof, an extremely thin separation functional layer constituted of another material (composite membrane). From the standpoint of producing water at a high rate, it is preferable that the semipermeable membranes is composite membranes. In particular, from the standpoints of permeate amount, chemical resistance, etc., polyamide-based composite membranes are preferred, and piperazine-polyamide-based composite membranes are more preferred.

The pipelines including the first raw-water feed pipeline PL1, second raw-water feed pipeline PL2, first connecting pipeline PL3, second connecting pipeline PL4, permeate pipeline PL5, concentrate drainage pipeline PL6, bypass pipeline PL7, and water feed pipeline PL8 may be any of resinous pipelines such as PVC pipes and polyethylene pipes, metallic pipelines such as carbon-steel pipes and stainless-steel pipes, or lined pipes obtained by lining the inner surfaces of metallic pipes with a resin. However, the material thereof must be selected while taking account of the quality of the raw water and the pressure necessary for the apparatus. In particular, the second connecting pipeline PL4 frequently undergoes a high pressure and, hence, it is preferred to use not a resinous pipeline but metallic pipes or lined pipes.

Generally used as the raw-water feed pump 4, water feed pump 14, and backwash pump 15 are centrifugal pumps. As the high-pressure pump 6, either a centrifugal pump or a plunger pump is generally used.

As the raw-water tank 3, use can be made of either a concrete tank or a resinous tank made of polyethylene, polypropylene, FRP, or the like. In the case where the raw water is taken from the sea, river, well, etc. and directly supplied to the pretreatment mechanism 1, an embodiment is possible in which the raw-water tank is omitted.

The manometer 8 is preferably an electronic pressure transmitter. The material of the part thereof which comes into contact with the liquid is selected while taking account of the quality of the raw water, like the material of the first connecting pipeline PL3.

The pressure control valve CV1, raw-water feed valves V1, and flow rate control valve CV2 each may be either a motor-operated valve or an air-operated valve. However, it is preferred to use air-operated valves equipped with a positioner, from the standpoint of responsiveness. The valve main bodies are generally globe valves, butterfly valves, or the like.

The pressure control part 9 and the flow rate control part 12 are generally ones which perform a PID operation. The pressure control part 9 and the flow rate control part 12 can perform the control using the PID operation function of a PLC or DSC for controlling the whole fresh-water production apparatus of the present invention or using a PID one-loop controller newly disposed.

From the standpoint of reducing pressure fluctuations during step shifts in the pretreatment mechanism 1, it is preferred to open/close as slowly as possible the valves involved in the step shifts, i.e., the raw-water feed valves V1, backwash drainage valves V5, and filtration valves V2 disposed on the pretreated-water side. In a preferred embodiment, speed controllers or positioners are disposed for that purpose in the case where the raw-water feed valves V1, backwash drainage valves V5, and filtration valves V2 are of the air-operated type.

Next, a method for operating the fresh-water production apparatus of the present invention is explained. Embodiments of the fresh-water production apparatus of the present invention are as described above, and the operation method of the present invention is explained in accordance with these embodiments. However, applications of the operation method are not limited to the embodiments of the fresh-water production apparatus of the present invention. Here, an explanation is given to methods for operating the fresh-water production apparatus (in particular, the pretreatment mechanism 1) while preventing the pretreatment membranes and the semipermeable membranes from being fouled and without adversely affecting the operation of the desalting mechanism.

In the method for operating the pretreatment mechanism 1 of the fresh-water production apparatus of the present invention, a basic procedure is to control the operation by periodically repeating a filtration initiation step, a filtration step, a filtration termination step, and a washing step for washing the pretreatment mechanism 1 (pretreatment membrane modules 5a and 5b). In the filtration initiation step, (i) the raw-water feed valves V1, backwash drainage valves V5, and filtration valves V2 which are in the closed state are operated in such a manner that the operation of opening the raw-water feed valves V1 is initiated while regulating the opening speed of the raw-water feed valves V1 to inhibit the pretreated water from fluctuating in pressure and the operation of opening the filtration values V2 is initiated after the pretreatment membrane modules 5a and 5b have come to have a raw-water-side pressure not lower than a give pressure or after the raw-water feed valves V1 have come to have a given degree of opening or higher, or (ii) the operation of opening the filtration valves V2 is initiated and the operation of opening the raw-water feed valves V1 is initiated after the pretreatment membrane modules 5a and 5b have come to have a raw-water-side pressure not lower than a given pressure or after the filtration valves V2 have come to have a given degree of opening or higher. During the filtration step, the raw-water feed valves V1 are kept completely open, the backwash drainage valves V5 are kept completely closed, and the filtration valves V2 are kept completely open. In the filtration termination step, (i) the raw-water feed valves V1 are closed at a closing speed regulated so as to inhibit the pretreated water from fluctuating in pressure and the filtration valves V2 are closed after the raw-water feed valves V1 have come to have a given degree of opening or lower, or (ii) the filtration valves V2 are closed at a closing speed regulated so as to inhibit the pretreated water from fluctuating in pressure and the raw-water feed valves V1 are closed after the filtration valves V2 have come to have a given degree of opening or lower; after performing the operation, the backwash drainage valves V5 are opened. Furthermore, in the washing step, the second water feed mechanism 10 provided to the fresh-water production apparatus separately from the first water feed mechanism is utilized to supply either the raw water or feed water including water to be treated which is different from the raw water, to the pretreatment mechanism 1, thereby supplying water to the pretreatment mechanism 1 and/or conducting flushing thereof.

In the case where the fresh-water production apparatus does not include the second water feed mechanism 10, it is preferable that the water supply and/or flushing in the washing step should be conducted by performing control in the following manner. The raw-water feed valves V1 are opened at an opening speed regulated so as to inhibit the pretreated water from fluctuating in pressure, until the raw-water feed valves V1 come to have a given degree of opening or higher or the raw water comes to flow at a given flow rate or higher. Thereafter, control of the raw-water flow rate by a PID operation is performed to supply the raw water, and the raw-water feed valves V1 are closed, after the lapse of a given time period, at a closing speed regulated so as to inhibit the pretreated water from fluctuating in pressure.

In another method of the present invention for operating the fresh-water production apparatus, when conducting the step of washing a part of the pretreatment mechanism 1 which has been separated from the filtration step, water supply and/or flushing is conducted in the washing step for the pretreatment mechanism 1 using, as feed water, either the concentrate discharged from the desalting mechanism 2 or a flushing drain.

In another method of the present invention for operating the fresh-water production apparatus, when conducting the step of washing a part of the pretreatment mechanism 1 which has been separated from the filtration step, water supply and/or flushing is conducted in the washing step for the pretreatment mechanism 1 by supplying second raw water retained in the second raw-water tank 13, with the water peed pump 14.

In another method of the present invention for operating the fresh-water production apparatus, when conducting the step of washing a pretreatment membrane module 5 which has been separated from the filtration step, feed water is supplied from the second raw-water tank 13 in the washing step for the pretreatment mechanism 1 by utilizing a difference in water head level, thereby conducting water supply and/or flushing.

In another method of the present invention for operating the fresh-water production apparatus, either the concentrate discharged from the desalting mechanism 2 or a flushing drain is utilized as feed water to conduct water supply in the washing step for the pretreatment mechanism 1, and the pretreatment mechanism 1 is then returned to the filtration step. During this return, control is performed to lower the recovery which is the ratio of the flow rate of the fresh water produced by the desalting mechanism 2 (permeate flow rate) to the flow rate of the pretreated water being supplied to the desalting mechanism.

In another method of the present invention for operating the fresh-water production apparatus, when conducting the step of washing a part of the pretreatment mechanism 1 which has been separated from the filtration step, water supply and/or flushing is conducted in the washing step for the pretreatment mechanism 1 by supplying the raw water by utilizing the water feed pump 14 or a difference in water head level.

In another method of the present invention for operating the fresh-water production apparatus, when conducting the step of washing a part of the pretreatment mechanism 1 which has been separated from the filtration step, water supply and/or flushing is conducted in the washing step for the pretreatment mechanism 1 using, as feed water, the raw water discharged from the system through the bypass pipeline PL7.

In another method of the present invention for operating the fresh-water production apparatus, water supply and/or flushing is conducted in the washing step for the pretreatment mechanism 1 using the raw water supplied with the raw-water feed pump, without utilizing the second raw water feed mechanism 10, by opening the raw-water feed valves V1 until the raw-water feed valves V1 come to have a given degree of opening or higher or the raw water comes to flow at a given flow rate or higher and thereafter performing control of the raw-water flow rate by a PID operation to supply the raw water to the pretreatment mechanism 1. After the raw water is supplied for a given time period, the operation of completely closing the raw-water feed valves V1 is performed.

In another method of the present invention for operating the fresh-water production apparatus, the feed water is the raw water, the pretreated water obtained by treatment with the pretreatment mechanism 1, the fresh water obtained by the treatment with the desalting mechanism 2, the concentrate discharged from the desalting mechanism 2, a flushing drain, or mixed water obtained by mixing two or more of these.

Figure 10:
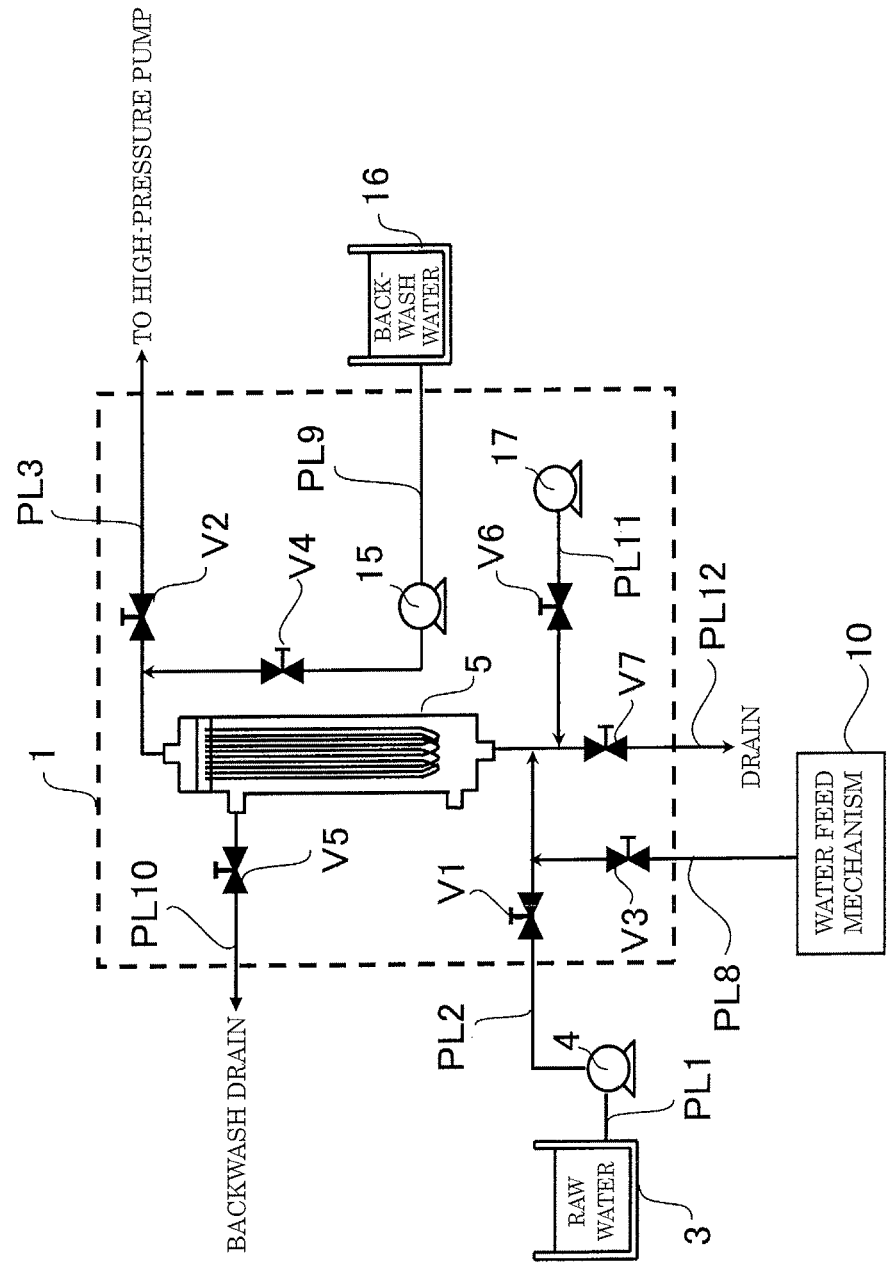
FIG. 10 is an apparatus flowchart diagrammatically showing an example of the pretreatment mechanism according to the present invention.
Figure 11:
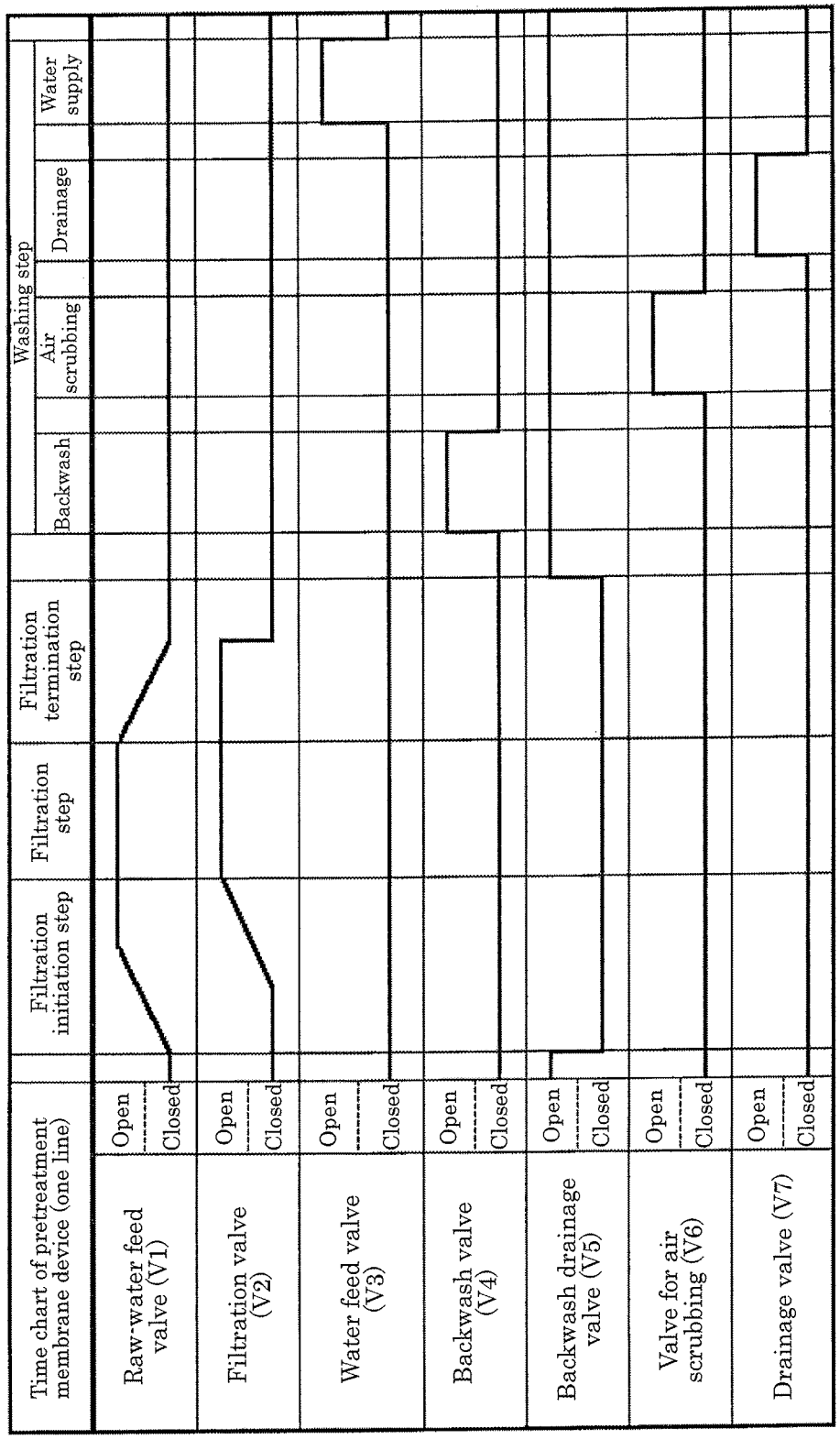
FIG. 11 is a time chart showing an example of methods for operating the pretreatment mechanism according to the present invention.
Figure 12:
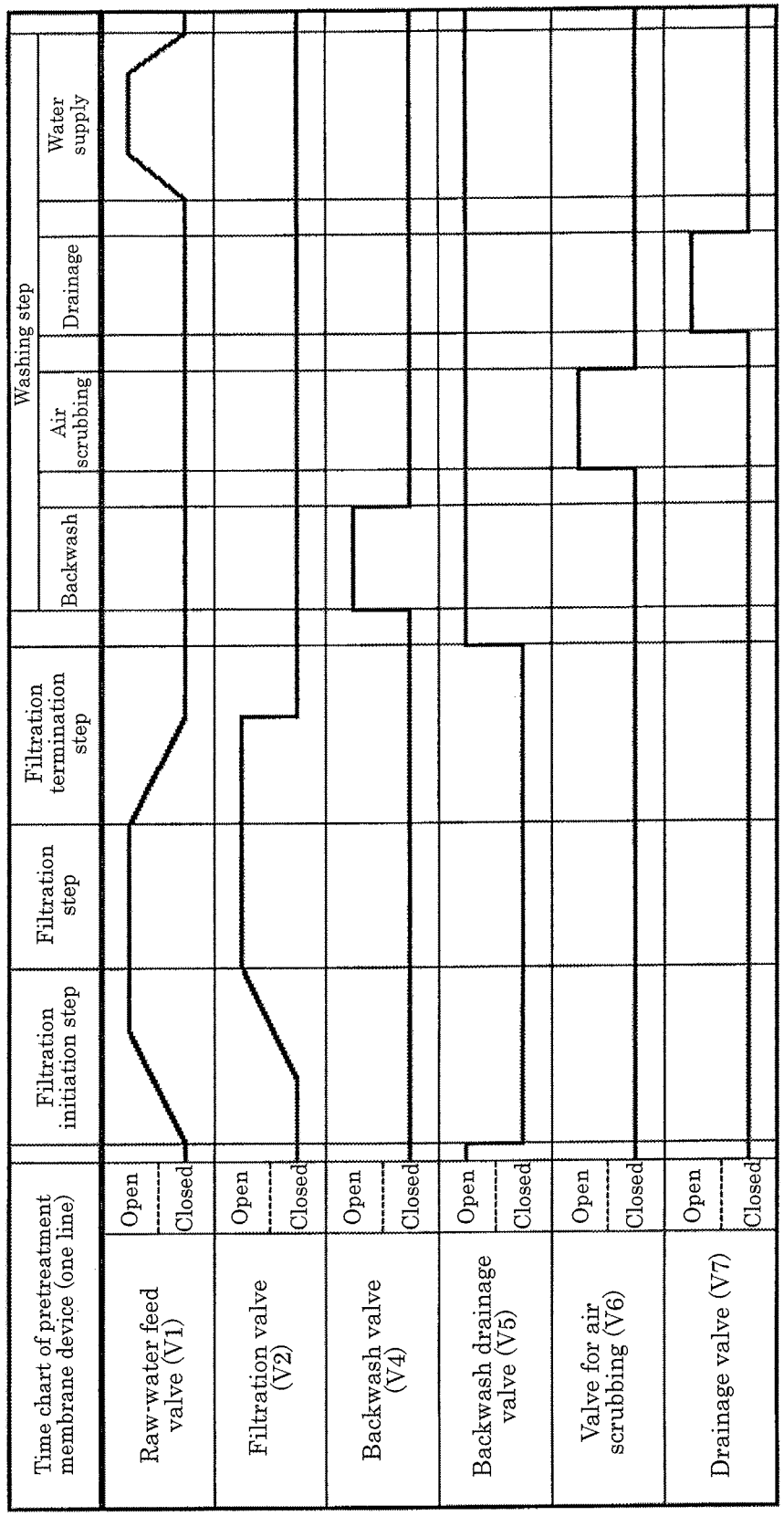
FIG. 12 a time chart showing another example of methods for operating the pretreatment mechanism according to the present invention.
Figure 13:
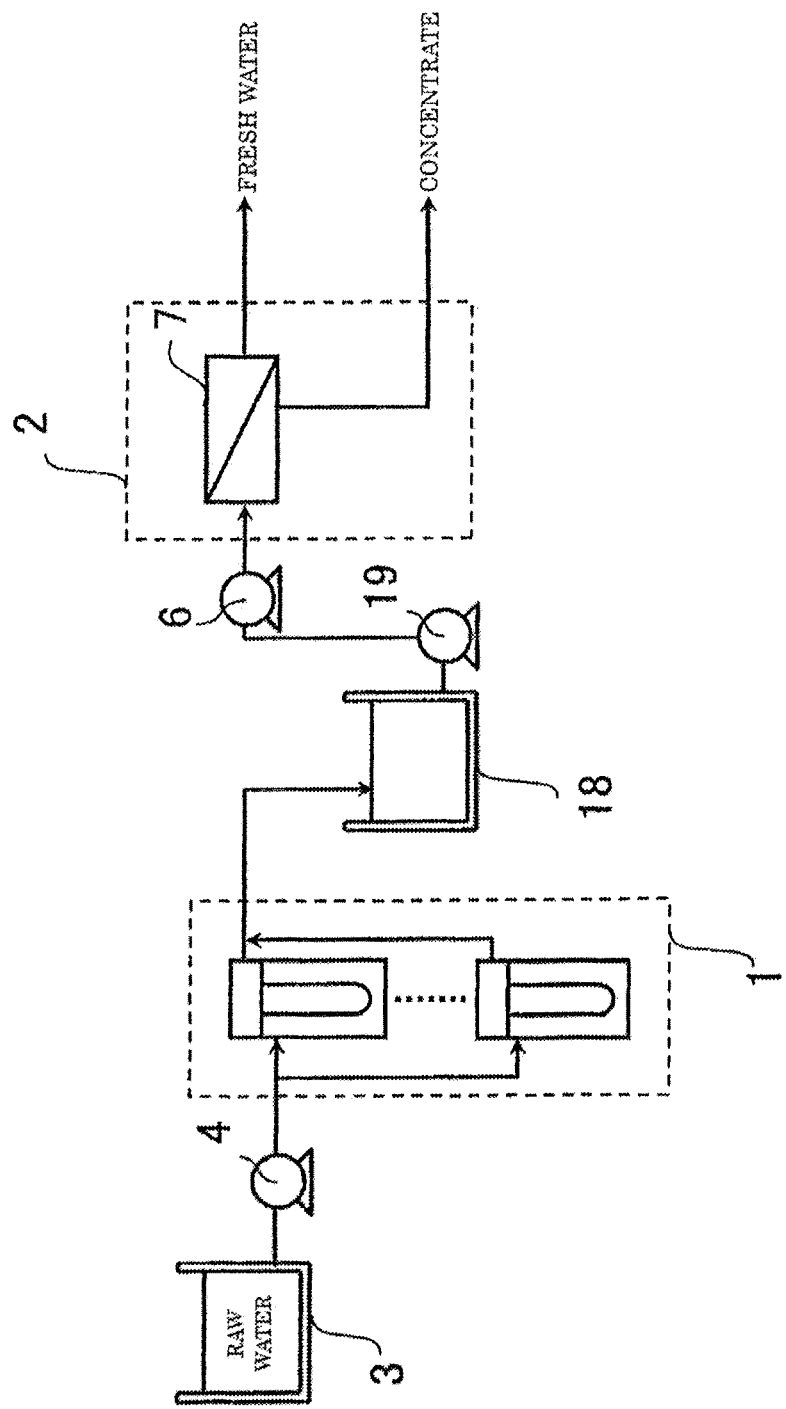
FIG. 13 is an apparatus flowchart diagrammatically showing an example of conventional fresh-water production apparatus.

With respect to the above-described methods of the present invention for operating the fresh-water production apparatus, an example of apparatus flowcharts of the pretreatment mechanism 1 is shown in FIG. 10 and examples of step-shift time charts are shown in FIGS. 11 and 12, in order to specifically explain step shifts in the pretreatment mechanism 1 and the washing step.

The pretreatment mechanism 1 shown in FIG. 10 includes: a pretreatment membrane module 5; a raw-water feed valve V1 disposed on a second raw-water feed pipeline PL1 and capable of being regulated with respect to opening/closing speed; a water feed pipeline PL8 connected to a position intermediate between the raw-water feed valve V1 and the pretreatment membrane module 5; a filtration valve V2 disposed on a first connecting pipeline PL3 in a pretreated-water-side and capable of being regulated with respect to opening/closing speed; a backwash valve V4 disposed on a backwash pipeline PL9; a backwash drainage valve V5 disposed on a backwash drainage pipeline PL10; a water feed mechanism 10; a water feed valve V3 disposed on the water feed pipeline PL8; a backwash pump 15 for supplying backwash water from a backwash-water tank 16 through the backwash pipeline PL9; a compressor 17 for sending air during air scrubbing; a valve for air scrubbing V6 disposed on a pipeline for air scrubbing PL11; a drainage pipeline PL12; and a drainage valve V7 disposed on the drainage pipeline PL12.

The pretreatment mechanism 1 and the desalting mechanism 2 has been directly connected to each other without via an intermediate tank or the like. In the operation method of the present invention, the pretreatment mechanism 1 periodically shifts from a filtration step to a washing step and is isolated from the filtration line. Consequently, although not shown in FIG. 10, a plurality of lines each including the same pretreatment mechanism 1 or pretreatment membrane module 5 are included in the apparatus. At least one line other than the line(s) where the washing step is conducted is operated so that the filtration step is continued therein.

In the present invention, the pretreatment membrane module 5 is operated in a manner for inhibiting the filtration resistance thereof from increasing, by repeating a filtration initiation step, a filtration step, a filtration termination step, and a washing step as shown by the time chart of FIG. 11.

In the filtration initiation step, the backwash drainage valve V5 is first closed, and all the valves (V1 to V7) involved in the line being operated (pretreatment membrane module 5) are brought into the closed state. Thereafter, the operation of opening the raw-water feed valve V at an opening speed regulated so as to inhibit the pressure of the pretreated water (pressure of the raw water being supplied to other lines disposed in parallel therewith) from fluctuating is initiated, and the operation of opening the filtration valve V2 is initiated after the line being operated (pretreatment membrane module) has come to have a raw-water-side pressure not lower than a given pressure or after the raw-water feed valve V1 has come to have a given degree of opening or higher.

In the operation of the fresh-water production apparatus of the present invention, it is desirable that the raw-water feed valve V1 and the filtration valve V2 should be opened and closed as slowly as possible, from the standpoint of inhibiting the pretreated water from fluctuating in pressure. However, in case where the opening or closing operation is conducted over too long a period, the step shifts require a longer time period and, hence, a higher load is imposed on the pretreatment membranes which are continuously undergoing a filtration step. Because of this, the time period from 0% to 100% or from 100% to 0% in terms of the degree of opening of the valve is set preferably at up to 120 seconds, more preferably at up to 60 seconds.

Although the operation of opening the raw-water feed valve V and the operation of opening the filtration valve V2 can be simultaneously initiated, this poses a problem in that there simultaneously are two portions where the line being operated, which is not in a pressurized state, joins a line where filtration is being conducted while maintaining a pressure, resulting in larger pressure fluctuations. It is therefore preferable that either the raw-water feed valve V1 or the filtration valve V2 should be opened first. Furthermore, it is preferable that the timing of performing the operations of opening the raw-water feed valve V1 and opening the filtration valve V2 should be such that the two opening operations overlap each other in order to operate the apparatus while keeping the pressure of the pretreated water constant and to shorten the time period required for the step shifts (valve operations). For example, in the case where the operation of opening the raw-water feed valve V1 has been initiated first, it is preferable that the operation of opening the filtration valve V2 should be initiated at the time when the raw-water-side pressure of the line being operated has reached a set pressure in the range of from the pressure lower by 50 kPa than a set pretreated-water pressure value to the pressure higher by 50 kPa than the set value (±50 kPa). In a preferred embodiment, a degree of opening of the raw-water feed valve at which the raw-water-side pressure is within ±50 kPa with respect to the set pretreated-water pressure value is set beforehand, and the degree of opening of the raw-water feed valve V1 is used as a condition for initiating the operation of opening the filtration valve V2. Although not shown in the drawing, a method can hence be used in which the sequence of operating the raw-water feed valve V1 and filtration valve V2 is reversed and the operation of opening the raw-water feed valve V1 is initiated after the raw-water-side pressure has become a given pressure or higher or after the filtration valve V2 has come to have a given degree of opening or higher. This method also is a preferred embodiment because the same effect is obtained.

In the filtration step, filtration is conducted subsequently to the filtration initiation step while keeping the raw-water feed valve V1 open and the filtration valve V2 open.

In the filtration termination step, control is performed in which the raw-water feed valve V1 is closed at a closing speed regulated so as to inhibit the pretreated water from fluctuating in pressure, and the filtration valve V2 is closed after the raw-water feed valve V1 has come to have a given degree of opening or lower. Alternatively, control is performed in which the filtration valve V2 is closed at a closing speed regulated so as to inhibit the pretreated water from fluctuating in pressure, and the raw-water feed valve V1 is closed after the filtration valve V2 has come to have a given degree of opening or lower.

With respect to the closing speed of the valve to be subjected first to the operation of closing, it is preferred to set the time period for closing speed preferably at up to 120 seconds, more preferably at up to 60 seconds. So long as the line being operated can be disconnected from other line(s) with the raw-water feed valve V1 or filtration valve V2 which has been subjected first to the operation of closing, the closing speed of the valve to be closed secondly need not be low. Although the given degree of opening in the filtration termination step may be set at will, it is preferred to set the degree of opening at 20% or less, from the standpoint of separation from the filtration.

Next, the washing step is explained in more detail. After the filtration termination step, the backwash valve V4 and the backwash drainage valve V5 are opened in order to conduct back-pressure washing (backwash). Thereafter, backwash water retained in the backwash-water tank 16 is supplied with the backwash pump 15 to the pretreatment membrane module 5 from the pretreated-water side, thereby conducting backwash.

As the backwash water, use can be made of the pretreated water, the fresh water and concentrate both produced by the desalting mechanism 2, etc. In the case where the pretreated water or the concentrate is used as the backwash water, an embodiment is possible in which the backwash water is directly supplied to the pretreated-water-side portion of the pretreatment membrane module 5 without via the backwash-water tank 16 or the backwash pump 15, although not shown in FIG. 10. The backwash water which has passed through the pretreatment membranes in the direction reverse to the filtration direction passes through the backwash drainage valve V5 which is open, and is discharged as washing wastewater from the pretreatment membrane module 5. After the backwash is conducted for a given time period, the backwash pump 15 is stopped and the backwash valve V4 is closed.

Simultaneously with or subsequently to the backwash, air scrubbing can be conducted in which compressed air is supplied from under the pretreatment membrane module 5 using the compressor 17 to wash the pretreatment membranes while vibrating the membranes.

After the backwash, the washing wastewater held in the pretreatment membrane module 5 is discharged through the drainage valve V7 disposed under the pretreatment membrane module 5.

After the discharge, the drainage valve V7 is closed and the water feed valve V3 is opened. As a result, feed water is supplied from the second water feed mechanism 10 to the raw-water-side portion of the pretreatment membrane module 5, and the air remaining in the raw-water-side portion escapes through the backwash drainage valve V5 which is open, thereby completing water supply. In this step, backwash can be utilized to conduct water supply. In this case, by conducing backwash with the drainage valve V7 kept closed, the raw-water-side portion of the pretreatment membrane module 5 is filled with water. By utilizing the concentrate from the desalting mechanism as the backwash water, the recovery of fresh water is improved. In an embodiment, the concentrate from the desalting mechanism is used as feed water in the case where the fresh water was used as the backwash water or the fresh water is used as feed water in the case where the concentrate from the desalting mechanism was used as the backwash water. In this embodiment, microorganisms can be damaged by the influence of a difference in osmotic pressure, and the pretreatment membrane module can be inhibited from suffering microorganism-induced fouling.

When conducting water supply, flushing can be applied in which the washing wastewater held in the raw-water-side portion of the pretreatment membrane module 5 is discharged through the backwash drainage valve V5. In this case, the washing wastewater may have been partly discharged through the drainage valve V7 or may not have been thus discharged. When performing the flushing, compressed air can be simultaneously supplied to conduct air scrubbing in combination with the flushing.

In the case of supplying the raw water as feed water without utilizing the second water feed mechanism 10, the raw-water feed valve V1 is opened at an opening speed regulated so as to inhibit the pretreated water from fluctuating in pressure, until the raw-water feed valve V1 comes to have a given degree of opening or higher or the raw water comes to flow at a given flow rate or higher. Thereafter, control of the raw-water flow rate is conducted by a PID operation to supply the raw water and, after the lapse of a given time period, the raw-water feed valve V is closed at a closing speed regulated so as to inhibit the pretreated water from fluctuating in pressure. Although the flow-rate control by a PID operation may be initiated when the raw-water feed valve V1 is in the closed state (degree of opening, 0%), this method is undesirable because too high a control speed in the flow-rate control makes it impossible to perform pressure control in time and the raw-water-side pressure of the other lines (the pretreatment membrane modules 5 where a filtration step is being conducted) fluctuates considerably, resulting in fluctuations in the pressure of the pretreated water. Meanwhile, in case where the control speed is too low, much time is required for the flow rate to become a set value. It is therefore desirable not to perform the flow-rate control until a preset given degree of opening or given flow rate is reached. Consequently, it is preferable that the speed of opening/closing the raw-water feed valve V1, during the period when the control by a PID operation is not performed, should be set at the same value as in the filtration initiation step or the filtration termination step.

After the air has completely escaped through the backwash drainage valve V5, the raw-water feed valve V1 or the water feed valve V3 is closed to thereby terminate the washing step. The pretreatment module 5 where the washing step has been conducted is returned to the filtration initiation step for returning this module 5 to the filtration step as in the other pretreatment membrane modules 5. In cases when the concentrate from the desalting mechanism was used for the water supply and this pretreatment membrane module as such is returned to a filtration step, then the concentrate with which the inside of the pretreatment membrane module is filled is supplied as pretreated water again to the desalting mechanism. In case where fresh-water production is conducted without changing the operating conditions within the desalting mechanism, there is a concern that scale deposition might occur in the raw-water-side portion of the semipermeable-membrane module, leading to fouling of the semipermeable membranes. Consequently, in a preferred embodiment, control is performed so as to lower the recovery, which is the ratio of the flow rate of the fresh water produced by the desalting mechanism (permeate flow rate) to the flow rate of the pretreated water being supplied to the desalting mechanism.

The pretreatment mechanism 1 includes a plurality of lines, and the filtration initiation step, filtration step, filtration termination step, and washing step are repeatedly and periodically conducted for each line as stated above. Since the number of lines under operation increases or decreases upon such step shifts, pressure fluctuations undesirably occur in the system. In case where the pressure fluctuations are large, this is causative of a failure of the high-pressure pump 6 or the desalting mechanism 2 is shut down due to interlocking with a decrease in the feed pressure of the high-pressure pump 6. Namely, a serious influence is undesirably exerted on the flow-rate control of the desalting mechanism 2. Consequently, under preferred conditions for operating the pretreatment mechanism and the desalting mechanism directly connected thereto, the pressure fluctuations are minimized. In a more preferred embodiment, the pressure fluctuations are reduced so as to be in the range of about ±10 kPa with respect to the set value of the pressure of the pretreated water (suction pressure of the high-pressure pump), although the set value depends on the specifications of the high-pressure pump 6. In cases when the pressure fluctuations can be sufficiently reduced, the set pressure can be lowered to around the minimum suction pressure of the high-pressure pump and, hence, the power (electric-power consumption) of the raw-water pump can be reduced accordingly.

In a method for producing fresh water from raw water using the fresh-water production apparatus of the present invention, the pretreatment mechanism 1 is operated (step shifts are conducted) in the following manner as shown in, for example, FIG. 2. The pressure control valve CV1 disposed on the bypass pipeline PL7, which branches off from the second raw-water feed pipeline PL2 and which is for discharging raw water from the system, is used to perform control of the pretreated-water pressure measured by the manometer 8 provided on the first connecting pipeline PL3, by the pressure control part 9 which controls the boost pressure (pretreated-water pressure) for sending the pretreated water into the high-pressure pump. (In the case of a pressure control mechanism employing an inverter which controls the output of the raw-water pump, the embodiment shown in FIG. 1 may be used.)

In the case where some of the plurality of lines of the pretreatment mechanism 1 have shifted from a filtration step to a washing step, the number of lines under operation decreases and, hence, the pressure for supplying the pretreated water to the high-pressure pump 6 decreases. However, the pressure control part 9 automatically begins to close the pressure control valve CV1, thereby keeping the pressure inside the system constant. Conversely, in the case where a line in the pretreatment mechanism 1 which has undergone a washing step returns to a filtration step, the number of lines under operation increases and, hence, the pressure for supplying the pretreated water to the high-pressure pump 6 increases. However, the pressure control part 9 automatically begins to open the pressure control valve CV1, thereby keeping the pressure inside the system constant.

Figure 14:
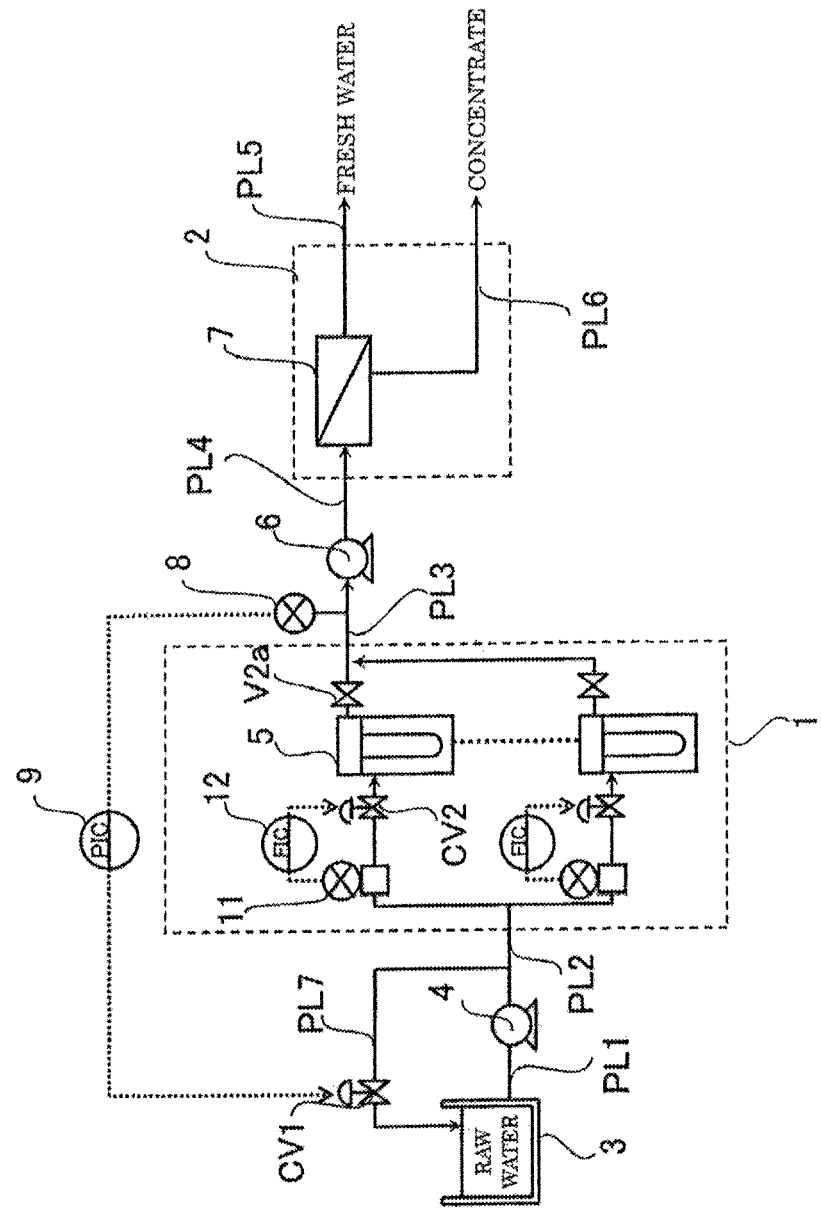
FIG. 14 is an apparatus flowchart diagrammatically showing another example of conventional fresh-water production apparatus.

As in the conventional fresh-water production apparatus described in Patent Document 1, such as that shown in FIG. 14, the above-described configurations of the fresh-water production apparatus of the present invention can be modified, with respect to each pretreatment mechanism 1, by further providing a flow meter 11 for measuring the flow rate of raw water being supplied to each of the pretreatment membrane modules 5 and a flow rate control part 12 and a flow rate control valve CV2 both for controlling the flow rate of the raw water being supplied to each pretreatment membrane module 5, on the second raw-water feed pipeline PL2, so that the flow meters 11, flow rate control parts 12, and flow rate control valves CV2 are used for controlling the flow rate of raw water in the filtration step. However, also in the desalting mechanism 2, which succeeds the pretreatment mechanism 1, flow-rate control of the pretreated water being supplied to the desalting mechanism 2 is generally performed. In this case, the flow-rate controls are serially connected and there is a concern that the controls might diverge due to an interaction between the controls. It is therefore preferred to perform no flow-rate control.

In a conventional method for water supply in a washing step, the apparatus includes no water feed mechanism 10 and raw water is supplied through the second raw-water feed pipeline PL2 that has been connected to the other lines, which are under continuous operation, and that retains a given pressure. Because of this, in the line where water supply is being conducted, some of the supplied raw water is discharged from the system to the drainage side, which is open to the air, through the backwash drainage valve V5 and the backwash drainage pipeline PL10. There has hence been a problem in that the pressure inside the other lines, which are under continuous operation, drops considerably. Patent Document 3 describes a measure in which a raw-water flow rate control valve CV2 is disposed in order to inhibit the pretreated water from fluctuating in pressure and is slowly opened or closed, thereby minimizing the pressure drop. However, there have been problems in that the time period required for water supply is prolonged accordingly and the filtration amount (load) for the other lines of pretreatment membrane modules 5, in which the washing step is not being conducted, increases, resulting in accelerated fouling of the membranes.

In the method for producing fresh water from raw water using the fresh-water production apparatus of the present invention, when conducting water supply or flushing in the step of washing the pretreatment mechanism, the lines under continuous operation can be prevented from decreasing in pressure by, for example, utilizing the second water feed mechanism shown in FIGS. 3 to 9 described above or conducing step shifts of the pretreatment mechanism by the valve operations shown in FIGS. 11 and 12. Thus, the pressure of the pretreated water (pressure for supplying to the desalting mechanism 2) can be always kept constant, and the desalting mechanism 2 can be stably operated without affecting the flow-rate control of the desalting mechanism 2.

This application is based on a Japanese patent application filed on Jun. 9, 2015 (Application No. 2015-116428), the contents thereof being incorporated herein by reference.

According to the fresh-water production apparatus of the present invention, the pretreatment mechanism can be operated while inhibiting the pretreated water from fluctuating in pressure. It is hence possible to obtain a fresh-water production apparatus in which the desalting mechanism can be stably operated. Furthermore, the time period required for water supply or flushing in the step of washing the pretreatment mechanism can be shortened, and the load to be imposed on the other lines, in which washing is not being conducted, can hence be reduced. Consequently, it is possible to operate the pretreatment mechanism while inhibiting the pretreatment membranes from being fouled.

DESCRIPTION OF REFERENCE NUMERALS AND SIGNS

1: Pretreatment mechanism
2: Desalting mechanism
3: Raw-water tank
4: Raw-water feed pump
5: Pretreatment membrane module
6: High-pressure pump
7: Semipermeable-membrane module
8: Manometer
9: Pressure control part
10: Second water feed mechanism
11: Flow meter
12: Flow rate control part
13: Second raw-water tank
14: Water feed pump
15: Backwash pump
16: Backwash-water tank
17: Compressor
18: Intermediate tank
19: Booster pump
CV1: Pressure control valve
CV2: Flow rate control valve
V1, V1a, V1b: Raw-water feed valve
V2, V2a, V2b: Filtration valve
V3, V3a, V3b: Water feed valve
V4: Backwash valve
V5: Backwash drainage valve
V6: Valve for air scrubbing
V7: Drainage valve
PL1: First raw-water feed pipeline
PL2: Second raw-water feed pipeline
PL3: First connecting pipeline
PL4: Second connecting pipeline
PL5: Permeate pipeline
PL6: Concentrate drainage pipeline
PL7: Bypass pipeline
PL8: Water feed pipeline
PL9: Backwash pipeline
PL10: Backwash drainage pipeline
PL11: Pipeline for air scrubbing
PL12: Drainage pipeline

The invention claimed is:

1. A fresh-water production apparatus comprising: a pretreatment mechanism including a plurality of lines each including a pretreatment membrane module for filtrating raw water to produce pretreated water; and a desalting mechanism including a semipermeable-membrane module for producing fresh water from the pretreated water supplied thereto, wherein the fresh-water production apparatus comprises: a high-pressure pump for directly supplying the pretreated water to the desalting mechanism; a first connecting pipeline in which one end thereof has been connected to each of the lines of the pretreatment mechanism and the other end thereof has been connected to the high-pressure pump; a second connecting pipeline in which one end thereof has been connected to the high-pressure pump and the other end thereof has been connected to the desalting mechanism; a permeate pipeline and a concentrate drainage pipeline in each of which one end has been connected to the desalting mechanism; a manometer which has been provided on the first connecting pipeline and which measures the pressure of the pretreated water being supplied to the high-pressure pump; and a pressure control mechanism for keeping the pressure of the pretreated water constant, the pretreatment mechanism includes, on the raw-water side in each line, a raw-water feed valve capable of being regulated with respect to opening/closing speed, and includes, on the pretreated-water side in each line, a filtration valve capable of being regulated with respect to opening/closing speeds a backwash drainage valve which is closed during filtration; and a control mechanism which controls the operation so that a filtration initiation step, a filtration step, a filtration termination step and a washing step are repeated, and controls so that at least one line other than the line(s) where the washing step is conducted is made to continuously perform the filtration step, and the fresh-water production apparatus further comprises a filtration initiation step control mechanism which, at the time of filtration initiation, from the state that the raw-water feed valve, the backwash drainage valve and the filtration valve are closed, (i) initiates an operation of opening the raw-water feed valve while regulating an opening speed of the raw-water feed valve to inhibit the pretreated water from fluctuating in pressure and initiates an operation of opening the filtration valve after the pretreatment membrane module has come to have a raw-water-side pressure not lower than a given pressure or after the raw-water feed valve has come to have a given degree of opening or higher, or (ii) initiates the operation of opening the filtration valve and initiates the operation of opening the raw-water feed valve after the pretreatment membrane module has come to have a raw-water-side pressure not lower than a given pressure.

2. The fresh-water production apparatus according to claim 1, comprising a filtration termination step control mechanism which (i) closes the raw-water feed valve at a closing speed regulated so as to inhibit the pretreated water from fluctuating in pressure and initiates an operation of closing the filtration valve after the raw-water feed valve has come to have a given degree of opening or lower, or which (ii) closes the filtration valve at a closing speed regulated so as to inhibit the pretreated water from fluctuating in pressure and initiates an operation of closing the raw-water feed valve after the filtration valve has come to have a given degree of opening or lower.

3. The fresh-water production apparatus according to claim 1, comprising a washing step control mechanism which opens the raw-water feed valve at an opening speed regulated so as to inhibit the pretreated water from fluctuating in pressure, until the raw-water feed valve comes to have a given degree of opening or higher or the raw water comes to flow at a given flow rate or higher, and which thereafter performs control of the raw-water flow rate by a PID operation to supply the raw water and closes the raw-water feed valve, after the lapse of a given time period, at a closing speed regulated so as to inhibit the pretreated water from fluctuating in pressure.

4. The fresh-water production apparatus according to claim 1, wherein the pretreatment mechanism comprises: a first water feed mechanism that is for supplying the raw water to the pretreatment mechanism and comprises a raw-water feed pump for supplying at least the raw water and a raw-water feed pipeline in which one end thereof has been connected to the raw-water feed pump and the other end thereof has been connected to each of the lines of the pretreatment mechanism; and a second water feed mechanism which supplies either the raw water or feed water that is water to be treated which is different from the raw water, to the pretreatment mechanism separately from the first water feed mechanism.

5. The fresh-water production apparatus according to claim 4, wherein the second water feed mechanism includes a water feed pipeline which has branched off from a concentrate drainage pipeline and in which one end thereof has been connected to each of the lines of the pretreatment mechanism.

6. A method for operating a fresh-water production apparatus comprising: a pretreatment mechanism including a plurality of lines each including a pretreatment membrane module for filtrating raw water to produce pretreated water; and a desalting mechanism including a semipermeable-membrane module for producing fresh water from the pretreated water supplied thereto, wherein the fresh-water production apparatus comprises: a high-pressure pump for directly supplying the pretreated water to the desalting mechanism; a first connecting pipeline in which one end thereof has been connected to each of the lines of the pretreatment mechanism and the other end thereof has been connected to the high-pressure pump; a second connecting pipeline in which one end thereof has been connected to the high-pressure pump and the other end thereof has been connected to the desalting mechanism; a permeate pipeline and a concentrate drainage pipeline in each of which one end has been connected to the desalting mechanism; a manometer which has been provided on the first connecting pipeline and which measures the pressure of the pretreated water being supplied to the high-pressure pump; and a pressure control mechanism for keeping the pressure of the pretreated water constant, the pretreatment mechanism includes: on the raw-water side in each line, a raw-water feed valve capable of being regulated with respect to opening/closing speed; on the pretreated-water side in each line, a filtration valve capable of being regulated with respect to opening/closing speed; and a backwash drainage valve which is closed during filtration, the pretreatment mechanism is operated to repeat a filtration initiation step, a filtration step, a filtration termination step and a washing step, and at least one line of the pretreatment, mechanism other than the line(s) where the washing step is conducted is made to continuously perform the filtration step, the pretreated water is directly supplied to the desalting mechanism with the high-pressure pump to produce fresh water, and at the time of filtration initiation, from the state that the raw-water feed valve, the backwash drainage valve and the filtration valve are closed, (i) control is performed to initiate an operation of opening the raw-water feed valve, while regulating an opening speed of the raw-water feed valve to inhibit the pretreated water from fluctuating in pressure, and initiate an operation of opening the filtration valve after the pretreatment membrane module has come to have a raw-water-side pressure not lower than a given pressure or after the raw-water feed valve has come to have a given degree of opening or higher, or (ii) control is performed to initiate the operation of opening the filtration valve and initiate the operation of opening the raw-water feed valve after the pretreatment membrane module has come to have a raw-water-side pressure not lower than a given pressure.

7. The method for operating a fresh-water production apparatus according to claim 6, wherein the raw-water feed valve is closed at a closing speed regulated so as to inhibit the pretreated water from fluctuating in pressure and an operation of closing the filtration valve is initiated after the raw-water feed valve has come to have a given degree of opening or lower, or the filtration valve is closed at a closing speed regulated so as to inhibit the pretreated water from fluctuating in pressure and an operation of closing the raw-water feed valve is initiated after the filtration valve has come to have a given degree of opening or lower.

8. The method for operating a fresh-water production apparatus according to claim 6, wherein the raw-water feed valve is opened at an opening speed regulated so as to inhibit the pretreated water from fluctuating in pressure, until the raw-water feed valve comes to have a given degree of opening or higher or the raw water comes to flow at a given flow rate or higher, thereafter control of the raw-water flow rate is performed by a PID operation to supply the raw water, and the raw-water feed valve is closed, after the lapse of a given time period, at a closing speed regulated so as to inhibit the pretreated water from fluctuating in pressure.

9. The method for operating a fresh-water production apparatus according to claim 6, wherein the pretreatment mechanism comprises: a first water feed mechanism that is for supplying the raw water to the pretreatment mechanism and comprises a raw-water feed pump for supplying at least the raw water and a raw-water feed pipeline in which one end thereof has been connected to the raw-water feed pump and the other end thereof has been connected to each of the lines of the pretreatment mechanism; and a second water feed mechanism which supplies either the raw water or feed water that is water to be treated which is different from the raw water, to the pretreatment mechanism separately from the first water feed mechanism, and in a filtration step of producing pretreated water, the first water feed mechanism is utilized to supply the raw water to one or more targeted lines of the pretreatment mechanism, and in a washing step of washing the pretreatment membrane modules, the second water feed mechanism is utilized to supply the feed water to one or more targeted lines of the pretreatment mechanism.

10. The method for operating a fresh-water production apparatus according to claim 9, wherein the second water feed mechanism includes a water feed pipeline which has branched off from a concentrate drainage pipeline and in which one end thereof has been connected to each of the lines of the pretreatment mechanism, and in a step of washing the pretreatment mechanism, a drain discharged through the concentrate drainage pipeline is supplied as the feed water.

* * * * *